(12) United States Patent
Nagai et al.

(10) Patent No.: US 9,911,113 B2
(45) Date of Patent: Mar. 6, 2018

(54) INFORMATION PROCESSING DEVICE AND INFORMATION PROCESSING METHOD

(75) Inventors: Hiroaki Nagai, Tokyo (JP); Yoshinobu Arisumi, Tokyo (JP); Takeshi Shibata, Kanagawa (JP)

(73) Assignee: Sony Corporation, Tokyo (JP)

(*) Notice: Subject to any disclaimer, the term of this patent is extended or adjusted under 35 U.S.C. 154(b) by 1076 days.

(21) Appl. No.: 12/596,234

(22) PCT Filed: Apr. 15, 2008

(86) PCT No.: PCT/JP2008/057346
§ 371 (c)(1),
(2), (4) Date: Oct. 16, 2009

(87) PCT Pub. No.: WO2008/133109
PCT Pub. Date: Nov. 6, 2008

(65) Prior Publication Data
US 2010/0145850 A1    Jun. 10, 2010

(30) Foreign Application Priority Data
Apr. 17, 2007 (JP) ................................ 2007-108238

(51) Int. Cl.
*G06Q 40/00* (2012.01)
*G06Q 20/00* (2012.01)
(Continued)

(52) U.S. Cl.
CPC ......... *G06Q 20/32* (2013.01); *G06Q 20/0655* (2013.01); *G06Q 20/105* (2013.01);
(Continued)

(58) Field of Classification Search
CPC .............................. G06Q 40/00; G06Q 20/00
(Continued)

(56) References Cited

U.S. PATENT DOCUMENTS 4,736,094 A * 4/1988 Yoshida .......................... 705/41
5,511,121 A * 4/1996 Yacobi ............................ 705/69
(Continued)

FOREIGN PATENT DOCUMENTS

JP         11-353397          12/1999
JP       11353397 A    *    12/1999
(Continued)

OTHER PUBLICATIONS

International Search Report dated May 27, 2008, for corresponding Patent Application PCT/JP2008/057346.

*Primary Examiner* — Sara C Hamilton
(74) *Attorney, Agent, or Firm* — K&L Gates LLP

(57) ABSTRACT

An electronic money server groups a parent who owns a parent mobile phone and children who own child mobile phones to be registered as a family, and credit information of the parent is also registered. When the child accesses the electronic money server by using the child mobile phone and specifies a money amount to request family charge, the electronic money server requests the parent mobile phone for permission of the family charge. When the parent grants the family charge, the electronic money server allows the parent mobile phone to decrease a value by the money amount specified by the child and to make the family settlement, and allows the child mobile phone to increase the value by this money amount and to effect the family charge. Further, the child mobile phone can accept issue of credit from a credit server on credit of the parent, thereby effecting the family charge.

7 Claims, 21 Drawing Sheets

(51) Int. Cl.
  *G06Q 20/32* (2012.01)
  *G06Q 20/10* (2012.01)
  *G06Q 20/18* (2012.01)
  *G06Q 20/34* (2012.01)
  *G06Q 20/36* (2012.01)
  *G06Q 20/42* (2012.01)
  *G06Q 30/04* (2012.01)
  *G06Q 20/06* (2012.01)
  *G06Q 20/16* (2012.01)

(52) U.S. Cl.
  CPC ............ *G06Q 20/16* (2013.01); *G06Q 20/18* (2013.01); *G06Q 20/322* (2013.01); *G06Q 20/3227* (2013.01); *G06Q 20/349* (2013.01); *G06Q 20/352* (2013.01); *G06Q 20/35785* (2013.01); *G06Q 20/363* (2013.01); *G06Q 20/42* (2013.01); *G06Q 30/04* (2013.01)

(58) Field of Classification Search
  USPC .............................................. 705/39; 235/380
  See application file for complete search history.

(56) References Cited

U.S. PATENT DOCUMENTS

| | | | |
|---|---|---|---|
| 5,845,260 A * | 12/1998 | Nakano et al. | 705/17 |
| 5,914,472 A * | 6/1999 | Foladare | G06Q 20/04 235/380 |
| 5,987,438 A * | 11/1999 | Nakano et al. | 705/41 |
| 5,991,747 A * | 11/1999 | Tomoyuki et al. | 705/41 |
| 6,076,075 A * | 6/2000 | Teicher | 705/41 |
| 6,173,269 B1 * | 1/2001 | Solokl | G07F 19/201 705/35 |
| 6,220,510 B1 * | 4/2001 | Everett et al. | 235/380 |
| 6,370,517 B2 * | 4/2002 | Yanagihara et al. | 705/41 |
| 6,611,819 B1 * | 8/2003 | Oneda | 705/41 |
| 6,764,001 B1 * | 7/2004 | Kawai et al. | 235/380 |
| 6,834,799 B2 * | 12/2004 | Tanabiki et al. | 235/382 |
| 7,708,190 B2 * | 5/2010 | Brandt et al. | 235/379 |
| 7,860,789 B2 * | 12/2010 | Hirka et al. | 705/39 |
| 8,065,230 B1 * | 11/2011 | Little | 705/40 |
| 2001/0029488 A1 * | 10/2001 | Takeshima et al. | 705/41 |
| 2001/0049636 A1 * | 12/2001 | Hudda et al. | 705/26 |
| 2002/0128977 A1 * | 9/2002 | Nambiar | G06F 21/34 705/64 |
| 2002/0194121 A1 * | 12/2002 | Takayama | 705/39 |
| 2002/0194129 A1 * | 12/2002 | Furuya et al. | 705/41 |
| 2003/0028481 A1 * | 2/2003 | Flitcroft | G06Q 20/00 705/39 |
| 2003/0085272 A1 * | 5/2003 | Andrews et al. | 235/380 |
| 2003/0197058 A1 * | 10/2003 | Benkert | G06Q 20/227 235/380 |
| 2003/0236728 A1 * | 12/2003 | Sunderji | G06Q 40/02 705/35 |
| 2004/0039694 A1 * | 2/2004 | Dunn | G06Q 20/04 705/39 |
| 2004/0133622 A1 * | 7/2004 | Clubb et al. | 709/200 |
| 2004/0143527 A1 * | 7/2004 | Benkert | G06Q 20/04 705/35 |
| 2004/0211830 A1 * | 10/2004 | Algiene | G06Q 20/10 235/379 |
| 2004/0260647 A1 * | 12/2004 | Blinn et al. | 705/41 |
| 2005/0033684 A1 * | 2/2005 | Benedyk et al. | 705/39 |
| 2005/0097017 A1 * | 5/2005 | Hanratty | G06Q 20/04 705/35 |
| 2005/0098624 A1 * | 5/2005 | Foss, Jr. | G06F 21/31 235/380 |
| 2005/0127169 A1 * | 6/2005 | Foss, Jr. | G06F 21/31 235/380 |
| 2005/0187873 A1 * | 8/2005 | Labrou et al. | 705/40 |
| 2006/0076400 A1 * | 4/2006 | Fletcher | G06Q 20/12 235/379 |
| 2006/0100933 A1 * | 5/2006 | Fujita | G06Q 20/10 705/26.35 |
| 2007/0000999 A1 * | 1/2007 | Kubo et al. | 235/380 |
| 2007/0057039 A1 * | 3/2007 | Carlson et al. | 235/380 |
| 2007/0214091 A1 * | 9/2007 | Hansen et al. | 705/64 |
| 2007/0233615 A1 * | 10/2007 | Tumminaro | G06Q 20/12 705/75 |
| 2007/0244811 A1 * | 10/2007 | Tumminaro | G06Q 20/10 705/39 |
| 2007/0255653 A1 * | 11/2007 | Tumminaro | G06Q 20/10 705/39 |
| 2007/0265984 A1 * | 11/2007 | Santhana | 705/65 |
| 2007/0282740 A1 * | 12/2007 | Wendt | 705/39 |
| 2008/0114694 A1 * | 5/2008 | Hamdane | G06Q 20/02 705/26.1 |
| 2008/0167988 A1 * | 7/2008 | Sun et al. | 705/39 |
| 2008/0208743 A1 * | 8/2008 | Arthur et al. | 705/41 |
| 2008/0228637 A1 * | 9/2008 | Scipioni et al. | 705/39 |
| 2008/0228638 A1 * | 9/2008 | Scipioni et al. | 705/39 |
| 2009/0106158 A1 * | 4/2009 | Hill | 705/66 |
| 2009/0119190 A1 * | 5/2009 | Realini | G06Q 20/04 705/30 |
| 2010/0288834 A1 * | 11/2010 | Tichelaer et al. | 235/380 |

FOREIGN PATENT DOCUMENTS

| | | |
|---|---|---|
| JP | 2000-250994 | 9/2000 |
| JP | 2001-222662 | 8/2001 |
| JP | 2002-189971 | 7/2002 |
| JP | 2002189971 A * | 7/2002 |
| JP | 2006-65620 | 3/2006 |
| JP | 2006-293500 | 10/2006 |
| JP | 2006293500 A * | 10/2006 |
| WO | 01/77863 | 10/2001 |

* cited by examiner

Fig.6

| FAMILY ID | FAMILY PASSWORD | FAMILY ACCOUNT NUMBER | ELECTRONIC MONEY FUNCTION UNIT ID | FAMILY RELATION-SHIP | ELECTRONIC MAIL ADDRESS | CREDIT INFORMATION | FAMILY CHARGE RESTRICTION INFORMATION | |
|---|---|---|---|---|---|---|---|---|
| ⋮ | ⋮ | ⋮ | ⋮ | ⋮ | ⋮ | ⋮ | ⋮ | ⋮ |
| 0 1 2 3 | 852tyu | F00153 | 12345678 | REPRESENT-ATIVE | abc@*** | CREDIT NUMBER SECURITY CODE | LIMIT PER SINGLE OPERATION LIMIT PER MONTH | |
| | | | 23456789 | REGULAR PERSON | def@*** | — | — | |
| | | | 34567890 | REGULAR PERSON | ghi@*** | — | — | |
| ⋮ | ⋮ | ⋮ | ⋮ | ⋮ | ⋮ | ⋮ | ⋮ | ⋮ |

Fig.16
(a) (PARENT MOBILE PHONE SCREEN)
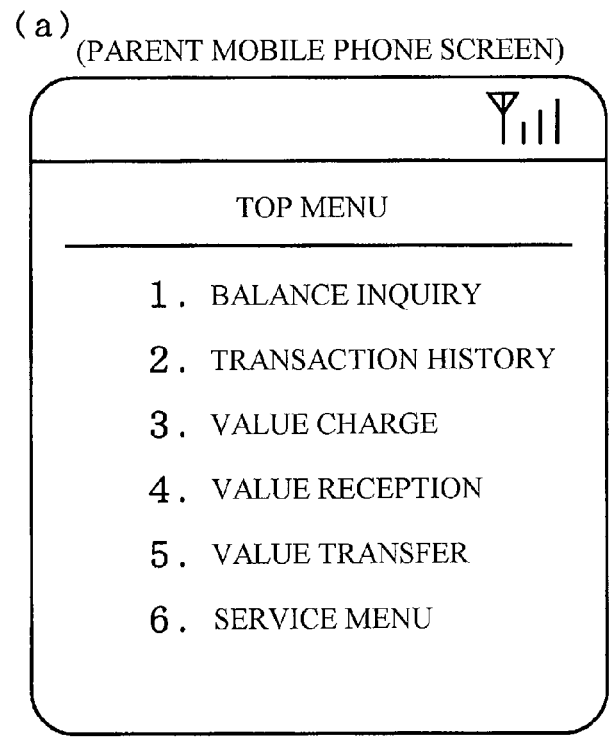
TOP MENU
1. BALANCE INQUIRY
2. TRANSACTION HISTORY
3. VALUE CHARGE
4. VALUE RECEPTION
5. VALUE TRANSFER
6. SERVICE MENU
(b) (PARENT MOBILE PHONE SCREEN)
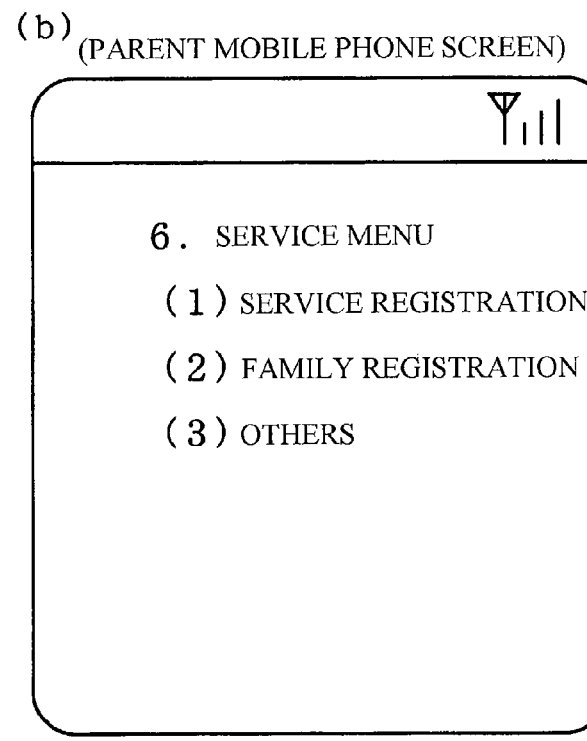
6. SERVICE MENU
   (1) SERVICE REGISTRATION
   (2) FAMILY REGISTRATION
   (3) OTHERS

Fig.17

(PARENT MOBILE PHONE SCREEN)

PLEASE PERFORM FAMILY REGISTRATION.

YOUR ELECTRONIC MONEY FUNCTION UNIT ID

FAMILY'S ELECTRONIC MONEY FUNCTION UNIT ID

CREDIT CARD NUMBER

CREDIT CARD SECURITY CODE

FAMILY'S CHARGE UPPER LIMIT

/ PER SINGLE OPERATION

/ PER MONTH

AMOUNT REQUIRING NO PRIOR PERMISSION

UP TO

TIME REQUIRED FOR PERMISSION

FAMILY PASSWORD

TRANSMIT

Fig.18
(a) (PARENT MOBILE PHONE SCREEN)
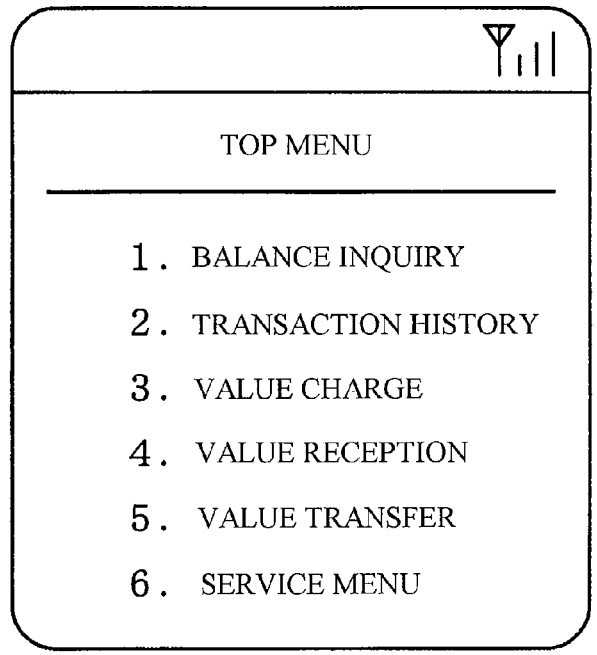
(b) (PARENT MOBILE PHONE SCREEN)
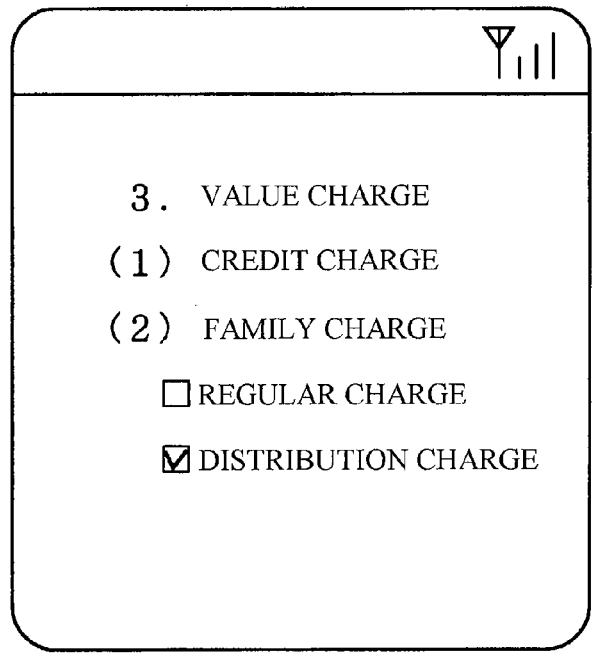

Fig.19

(a)
(PARENT MOBILE PHONE SCREEN)

DISTRIBUTION CHARGE

CHARGE AMOUNT

CREDIT SECURITY CODE

DISTRIBUTION DESTINATION ▼

DISTRIBUTION AMOUNT

DISTRIBUTION TIME

MESSAGE

TRANSMIT (b)
(PARENT MOBILE PHONE SCREEN)

ELECTRONIC MONEY FUNCTION UNIT ID

MR./MS. 12345678

PREPARATION FOR DISTRIBUTION OF VALUE 500 YEN IS COMPLETED.

ELECTRONIC MONEY FUNCTION UNIT ID

TO MR./MS. 23456789 AND MR./MS. 34567890

VALUE 500 YEN IS SET AND MESSAGE IS TRANSMITTED AT 10 AM IN APRIL 20, 2007.

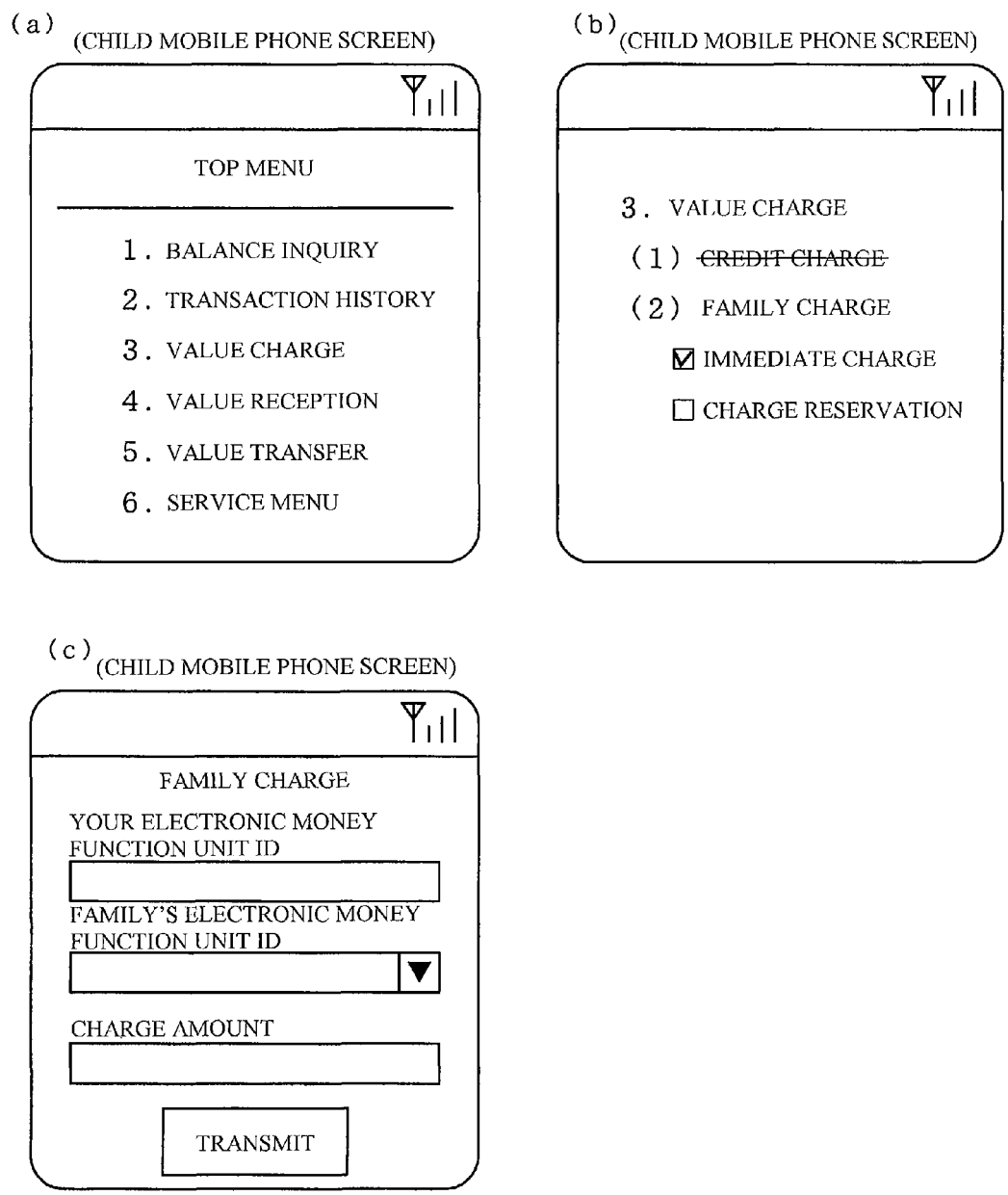

Fig.22
(a) (CHILD MOBILE PHONE SCREEN)
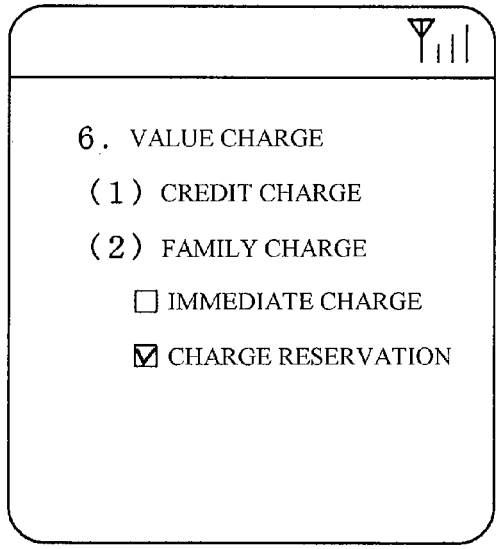
(b) (CHILD MOBILE PHONE SCREEN)
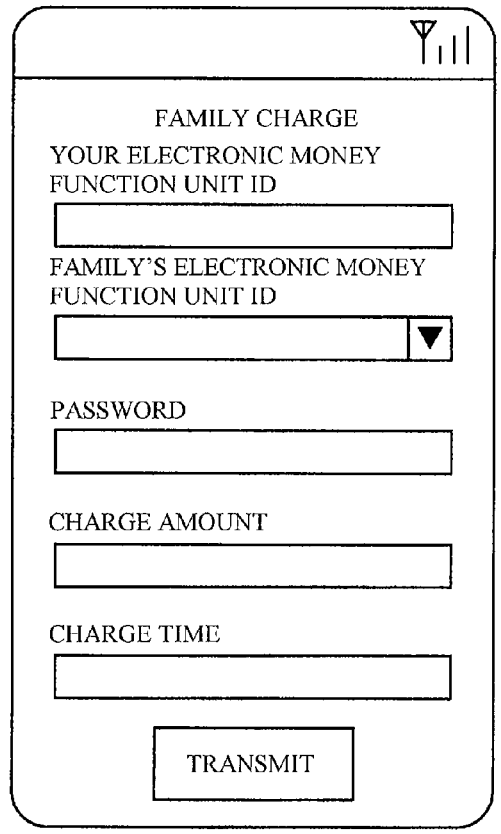
(c) (CHILD MOBILE PHONE SCREEN)
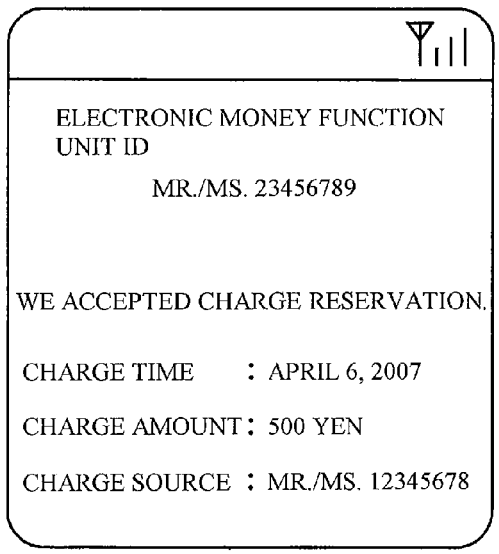

INFORMATION PROCESSING DEVICE AND INFORMATION PROCESSING METHOD

CROSS REFERENCE TO RELATED APPLICATIONS

The present application is a National Stage of International Application No. PCT/JP2008/057346 filed on Apr. 15, 2008 and which claims priority to Japanese Patent Application No. 2007-108238 filed on Apr. 17, 2007, the entire contents of which are being incorporated herein by reference.

BACKGROUND

The present disclosure relates to an information processing device and an information processing method, and it relates to, e.g., those that put a monetary value stored in a portable terminal into circulation.

With recent spread of electronic money, business transactions using the electronic money have been actively carried out.

The business transactions using the electronic money are carried out based on shift of a value by operating electronic data having an exchange value called "value" equivalent to money.

The value is electronic data representing a money amount, and it is written in an IC chip as money amount information.

This IC chip is included in, e.g., a resin card or a mobile phone, and it is carried by a user as an electronic purse.

A store accesses the IC chip from an electronic money terminal installed therein and reduces a money amount of the value stored in the IC chip to make settlement.

Further, the IC chip can be accessed from the electronic money terminal to increase a money amount of the value stored in the IC chip. Processing of increasing the value is called "charge".

In case of the charge, the value is associated with a currency by collecting money corresponding to a charge from a user of the IC chip.

As a technology that uses the value stored in the IC chip to make settlement in this manner, there is, e.g., the following service providing method. This technology uses the value previously stored in the IC card to make payment in compensation for a service.

Patent Citation 1: Japanese Patent Application Laid-open No. 2000-250994

Furthermore, as another operation, credit information is registered in an electronic money server in association with the IC chip, and the IC chip is charged with the value based on the credit.

Moreover, the IC chip is generally included in a mobile phone that can be connected to a network and, in this case, a user can access the electronic money server from the mobile phone to immediately charge the IC chip.

For example, a user who cannot own a credit card, e.g., a child supported by parents cannot immediately perform the charge online even though he/she owns a mobile phone that has a built-in IC chip and can be connected to a network, and his/her mobile phone must be charged at an electronic money terminal in, e.g., a store.

Additionally, when a user owns an IC card that has a built-in IC chip and an electronic money function, this IC card can be set in a terminal device at home and the like and connected with an electronic money server through a network to perform the charge based on credit, but a user such as a child must pay at an electronic money terminal installed in, e.g., a store to carry out the charge.

SUMMARY

It is, therefore, an object of the to facilitate increasing a monetary value stored in, e.g., a portable terminal.

To achieve this object, according to an embodiment an information processing device is provided that executes information processing with respect to a portable terminal that includes a function of increasing/decreasing a stored monetary value based on increase information or decrease information, comprising: correspondence storing means for storing intrinsic information that is used to allow a representative to make settlement and the portable terminal owned by a regular person in association with each other in regard to a group including the representative and the regular person; increase request accepting means for accepting an increase request for the monetary value of a predetermined money amount from the portable terminal; settlement means for making settlement of the predetermined money amount requested to increase on defrayment of the representative by using the associated intrinsic information; and increase information transmitting means for transmitting the increase information that is used to increase the monetary value of the predetermined money amount requested to increase to the portable terminal.

In an embodiment, the information processing device comprises restrictive condition storing means for storing restrictive conditions when transmitting the increase information to the portable terminal, wherein the increase information transmitting means transmits the increase information in accordance with the stored restrictive conditions.

In an embodiment, the intrinsic information is transmission destination information for a settlement terminal that is owned by the representative and decreases a stored monetary value based on the decrease information, the information processing device comprises connection request transmitting means for transmitting a connection request to the settlement terminal by using the transmission destination information, and the settlement means makes settlement by transmitting the decrease information that is used to decrease the monetary value of the predetermined money amount to the settlement terminal connected in response to the connection request.

In an embodiment, the increase information transmitting means transmits the increase information after the settlement means makes settlement in the settlement terminal.

In an embodiment, the settlement means makes settlement in the settlement terminal after the increase information transmitting means transmits the increase information to the portable terminal.

In an embodiment, settlement permission request transmitting means are provided for transmitting a settlement permission request to the settlement terminal by using the transmission destination information, wherein the settlement means makes settlement when it receives a permission notification with respect to the transmitted settlement permission request from the settlement terminal.

In an embodiment, when no response is returned from the settlement terminal within a predetermined time after the settlement permission request is transmitted, the increase information transmitting means transmits the increase information that is used to increase the monetary value of the predetermined money amount requested to increase to the portable terminal.

In an embodiment, the information processing device includes transmission date and hour accepting means for accepting a setting of a date and hour that the increase information is transmitted from the portable terminal, wherein the settlement means transmits the decrease information to the settlement terminal until the accepted transmission date and hour, and the increase information transmitting means transmits the increase information to the portable terminal after the transmission date and hour.

In an embodiment, the correspondence storing means stores credit information of the representative as second intrinsic information, the information processing device comprises credit acquiring means for acquiring credit of the representative from a credit server by using the stored credit information, and the settlement means makes settlement based on the acquired credit when a predetermined condition is met.

In an embodiment, the information processing device comprises balance confirming means for confirming a balance of the monetary value in the settlement terminal, wherein the predetermined condition is that the confirmed balance is equal to or below a predetermined money amount.

In an embodiment, wherein the intrinsic information is credit information of the representative, the information processing device comprises credit acquiring means for acquiring credit of the representative from a credit server by using the stored credit information, and the settlement means makes settlement by using the acquired credit.

In an embodiment, the information processing device comprises monetary value storing means for storing a monetary value generated by using the credit in advance, wherein the settlement means makes settlement by decreasing the predetermined amount from the stored monetary value.

In an embodiment, the monetary value storing means is capable of storing a monetary value in accordance with each portable terminal, the information processing device comprises distributing means for distributing the generated monetary value in accordance with each portable terminal based on a preset distribution amount and storing the same in the monetary value storing means, and the increase information transmitting means transmits the increase information that is used to increase a money amount of the monetary value distributed to the portable terminal when the portable terminal issues an increase request.

In an embodiment, an information processing method is provided for using a computer to execute information processing with respect to a portable terminal that includes a function of increasing/decreasing a stored monetary value based on increase information or decrease information, the computer comprising: correspondence storing means for storing intrinsic information that is used to allow a representative to make settlement and the portable terminal owned by a regular person in association with each other in regard to a group including the representative and the regular person; increase request accepting means; settlement means; and increase information transmitting means, the method comprising: an increase request accepting step of accepting an increase request for the monetary value of a predetermined money amount from the portable terminal by the increase request accepting means; a settlement step of making settlement of the predetermined amount requested to increase on defrayment of the representative by using the associated intrinsic information by the settlement means; and an increase information transmitting step of transmitting the increase information that is used to increase the monetary value of the predetermined amount requested to increase to the portable terminal by the increase information transmitting means.

In an embodiment, an information processing device is provided that executes information processing through a communication terminal with respect to a monetary terminal including a function of increasing/decreasing a stored monetary value based on increase information or decrease information, comprising: correspondence storing means for storing intrinsic information that is used to allow a representative to make settlement and the monetary terminal owned by a regular person in association with each other in regard to a group including the representative and the regular person; increase request accepting means for accepting an increase request for the monetary value of the predetermined money amount for the monetary terminal from the communication terminal; settlement means for making settlement of the predetermined money amount requested to increase on defrayment of the representative by using the associated intrinsic information; connecting means for achieving connection with the monetary terminal through the communication terminal; and increase information transmitting means for transmitting the increase information that is used to increase the monetary value of the predetermined money amount requested to increase to the connected monetary terminal.

According to the embodiment, increasing a monetary value based on defrayment of a representative enables readily increasing the monetary value stored in, e.g., a mobile phone.

Additional features and advantages are described herein, and will be apparent from, the following Detailed Description and the figures.

BRIEF DESCRIPTION OF THE FIGURES

FIG. 6 is a view showing an example of a logical configuration of a family database;

FIG. 16 shows an example of screens displayed in a display of the parent mobile phone;

FIG. 17 shows an example of a screen displayed in the display of the parent mobile phone;

FIG. 18 shows an example of screens displayed in the display of the parent mobile phone;

FIG. 19 shows an example of screens displayed in the display of the parent mobile phone;

FIG. 20 shows an example of screens displayed in a display of the child mobile phone;

FIG. 22 shows an example of screens displayed in the display of the child mobile phone.

DETAILED DESCRIPTION (1) Outline of Embodiment

In this embodiment, mobile phones (each of which has a built-in IC chip for electronic money and can be connected to a network) owned by family members are grouped and registered as a family to enable transferring a value from a parent's mobile phone to a child's mobile phone. Further, credit information of the parent can be registered in an electronic money server 2 in advance to enable charging the child's mobile phone on the parent's credit.

Figure 1:
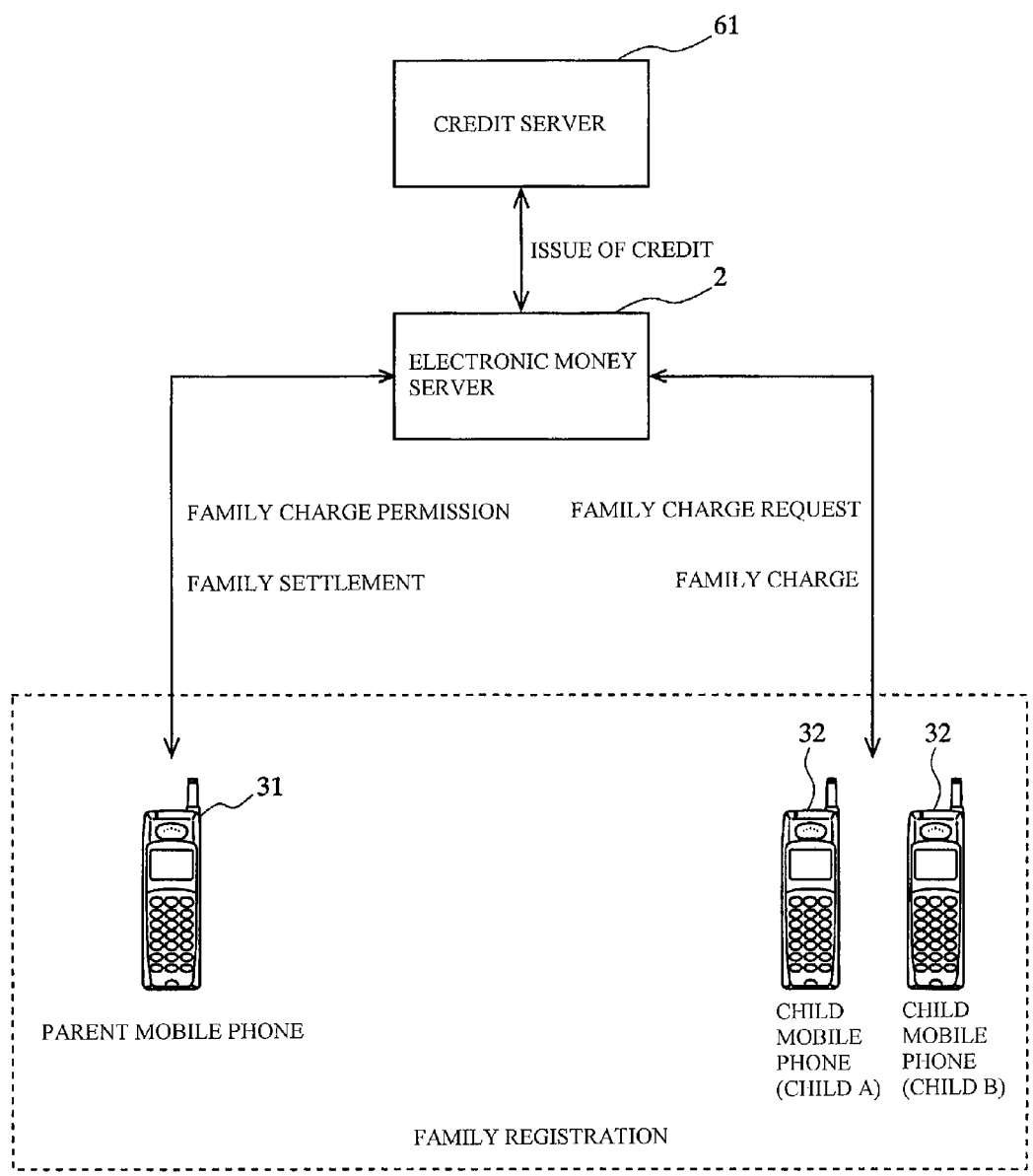
FIG. 1 is a view for explaining an outline of an embodiment.

An outline of this embodiment will now be described hereinafter with reference to FIG. 1.

The electronic money server 2 groups a parent who owns a parent mobile phone 31 and children A and B who own child mobile phones 32 and 33 to be registered as a family, and credit information of the parent is also registered.

When the child accesses the electronic money server 2 through the child mobile phone 32 and specifies a money amount to request family charge, the electronic money server 2 requests the parent mobile phone 31 to permit the charge.

When the parent permits, the electronic money server 2 reduces a value corresponding to the money amount specified by the child to perform family settlement with respect to the parent mobile phone 31, and the child mobile phone 32 increases the value corresponding to this money amount to carry out the family charge. As a result, the value is transferred to the child mobile phone 32 from the parent mobile phone 31.

Furthermore, the child mobile phone 32 may accept the issue of credit from a credit server 61 on credit of the parent to thereby perform the family charge.

As explained above, in the electronic money system 1, using the value in the parent mobile phone 31 or the credit of the parent enables effecting the family charge in the child mobile phone 32 online based on defrayment of the parent, but various modifications can be carried out as will be explained in "Detail of Embodiment".

(2) Details of Embodiment

Figure 2:
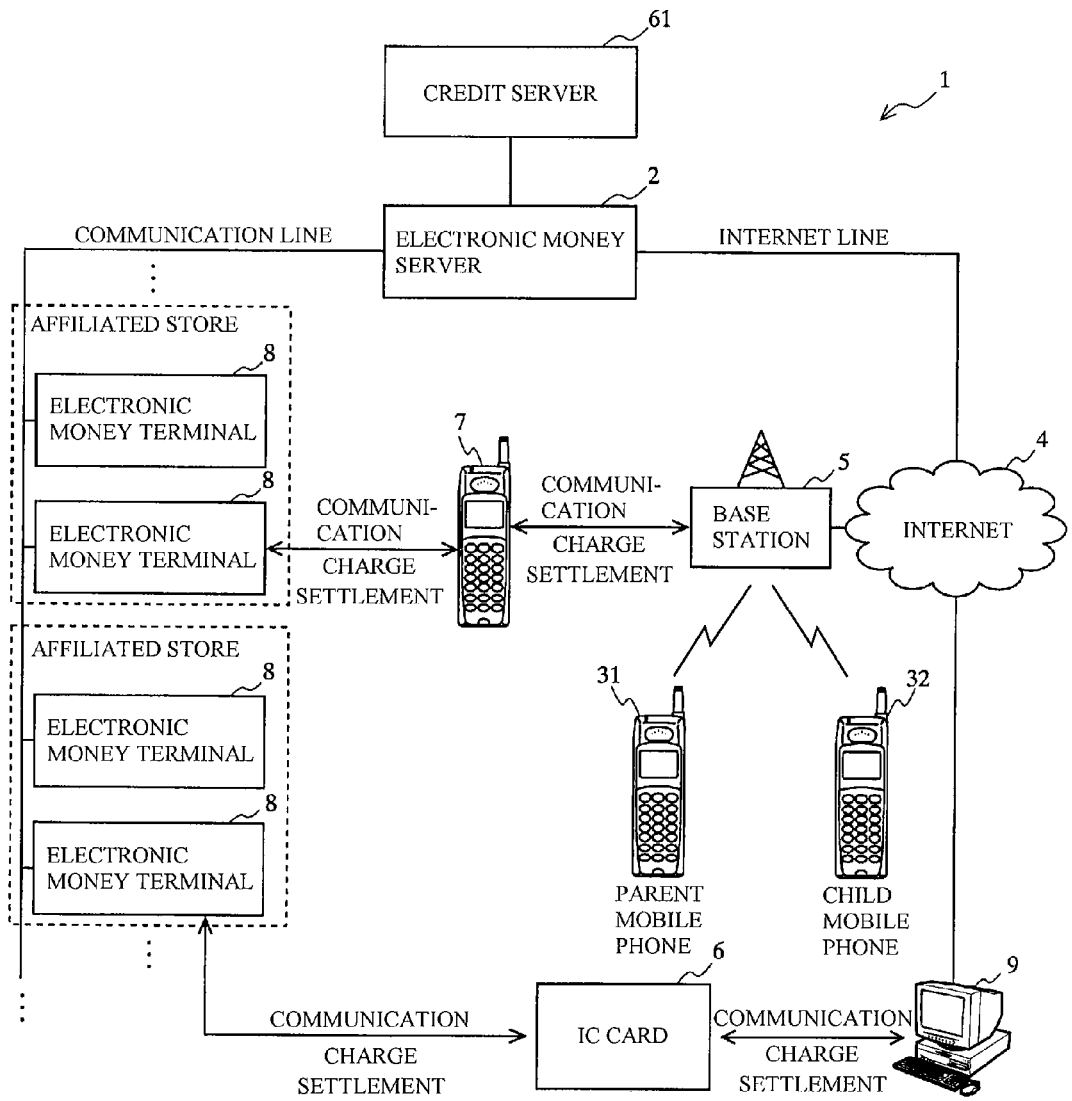
FIG. 2 is a view showing a network configuration of an electronic money system.

FIG. 2 is a view showing a network configuration of the electronic money system 1.

The electronic money system 1 is constituted of a mobile phone 7, an electronic money server 2, the Internet 4, a base station 5, an IC card 6, a user terminal 9, electronic money terminals 8, a credit server 61, and others.

It is to be noted that the mobile phone 7 includes a parent mobile phone 31 and a child mobile phone 32 that are registered as a family. That is, a parent's mobile phone 7 registered as a family is the parent mobile phone 31, and a child's mobile phone 7 is the child mobile phone 32.

The mobile phone 7 has a built-in non-contact type IC chip having an electronic money processing function, and can be connected to the electronic money terminal 8 and others based on near field wireless communication.

That is, when making settlement by using the value in the mobile phone 7 is desired, the mobile phone 7 is set to a reader/writer of the electronic money terminal 8 like the IC card 6 (which will be described later), and a sales assistance in an affiliated store can reduce the value corresponding to a payment from the mobile phone 7 by operating the electronic money terminal 8.

It is to be noted that the value is a concept corresponding to money in the electronic money system 1 and is monetary information representing a money amount of a monetary value as electronic data, and the IC chip functions as a monetary terminal.

To execute such a function, the IC chip has a function of storing the value and a function of changing the stored value by using money amount change information.

The money amount change information includes increase information for increasing the value and decrease information for decreasing the value, and the IC chip increases a balance of the stored value by using the increase information and decreases a balance of the value by using the decrease amount.

It is to be noted that processing of increasing the value is called "charge" and processing of decreasing the value is called "settlement".

Further, the mobile phone 7 can communicate with the electronic money server 2 through the Internet 4 by performing wireless communication with the base station 5.

Therefore, the mobile phone 7 can receive the money amount change information from the electronic money server 2 to increase/decrease the value.

An affiliated store keeps money corresponding to an amount to be charged from a user when charging the mobile phone 7 at the electronic money terminal 8, and an electronic money center keeps the money in credit settlement on credit of the user when charging from the electronic money server 2.

Furthermore, the money that is kept from the user is distributed to the affiliated store in accordance with settlement using the value, thereby associating the value with the currency.

The parent mobile phone 31 is the parent's mobile phone 7 subjected to family registration in the electronic money server 2, and the child mobile phone 32 is the child's mobile phone 7 subjected to the family registration. A functional configuration of each of the parent mobile phone 31 and the child mobile phone 32 is the same as that of the mobile phone 7.

Since the value is transferred from the parent mobile phone 31 to the child mobile phone 32 by later-explained family charge, the child mobile phone 32 functions as a portable terminal having a function of increasing/decreasing a stored monetary value (i.e., the value) based on the increase information or the decrease information, and the parent mobile phone 31 functions as a settlement terminal that reduces the stored monetary value based on the decrease information.

It is to be noted that the users of the mobile phone 7 are grouped and registered as a family in this embodiment, but it is just an example, and a human relationship between constituent members of the group may be arbitrary. Furthermore, the user may be a natural person or a legal person.

That is, the electronic money server 2 takes a configuration that the users of the mobile phone 7 are grouped under the name of the family registration, one or more constituent members defray a payment, and other constituent members perform the charge online.

Moreover, the electronic money server 2 gives a constituent member who defrays a charge payment an attribute "representative" and gives a constituent member who performs the charge an attribute "regular person" to discriminate a person who defrays the charge payment from a person who performs the charge.

Therefore, for example, the mobile phone 7 can be given to each person responsible for a sales team or an express package service team, a company that is a legal person can be determined as a representative, and each person in charge can be subjected to the family registration as a regular person.

Although the parent and the child will be taken as an example in the following description, the parent and the child can be regarded as a representative and a regular person, respectively.

Additionally, a group subjected to the family registration will be referred to as a family group, charge based on transfer of funds in the family group will be referred to as family charge, and settlement (i.e., decreasing the value from the parent mobile phone 31 when transferring the value from the parent mobile phone 31 to the child mobile phone 32) will be referred to as family settlement.

The IC card 6 is an electronic money card having an IC chip equivalent to that included in the mobile phone 7.

The IC card 6 can communicate with electronic money terminal 8 to perform the charge or the settlement, and can be connected with the electronic money server 2 through the user terminal 9 to communicate with the electronic money server 2 for effecting the charge or the settlement.

The user terminal 9 is, e.g., a personal computer including a device that accesses a non-contact type IC chip called a reader/writer, and it includes a function of achieving connection with the Internet 4.

The user terminal 9 can be connected with the IC chip of the mobile phone 7 or the IC card 6 through the reader/writer to mediate communication between the IC chip and the electronic money server 2.

The electronic money server 2 collects information concerning circulation of the value in the electronic money system 1 and manages the association of the value and the currency.

For example, the electronic money server 2 requests the electronic money terminal 8 to transmit utilization log data through a communication line and performs the fund settlement for each affiliated store in accordance with the charge of the value or the settlement, thereby shifting the currency in association with the distribution of the value.

Further, the electronic money server 2 registers a parent and a child as a family and performs the family charge with respect to the child mobile phone 32 to the parent's cost.

The electronic money server 2 functions as an information processing device that carries out information processing with respect to each portable terminal having a function of increasing/decreasing a stored monetary value based on increase information or decrease information.

The affiliated store is a store (e.g., a convenience store, a department store, a restaurant, any other retail store, a commercial vehicle, or any other mobile object) where the settlement or the charge using the value can be effected by utilizing the mobile phone 7 or the IC card 6, and it includes one or more electronic money terminal 8 in an accounting area.

The electronic money terminal 8 is a terminal that accesses the IC chip of the mobile phone 7 or the IC card 6 based on near field communication, and it is solely installed or it is incorporated in an accounting device (an electronic cash register) or the like to be installed.

Alternatively, as another installation conformation, the electronic money terminal 8 dedicated to the charge is installed in an open space of commercial facilities, or the electronic money terminal 8 dedicated to the settlement is incorporated in an automatic vending machine to be used for the settlement in the automatic vending machine.

The electronic money terminal 8 can transmit money amount change information to the mobile phone 7 or the IC card 6 to execute the charge or the settlement.

The credit server 61 is a server device managed by a credit company, and it examines a user of a credit card to issue credit.

The credit server 61 can be connected to the electronic money server 2, and it issues credit upon receiving a request to examine a user of the mobile phone 7 or the IC card 6 for credit from the electronic money server 2.

The electronic money server 2 can generate the value based on this credit and charge the mobile phone 7 or the IC card 6 online (i.e., through the Internet 4).

Figure 3:
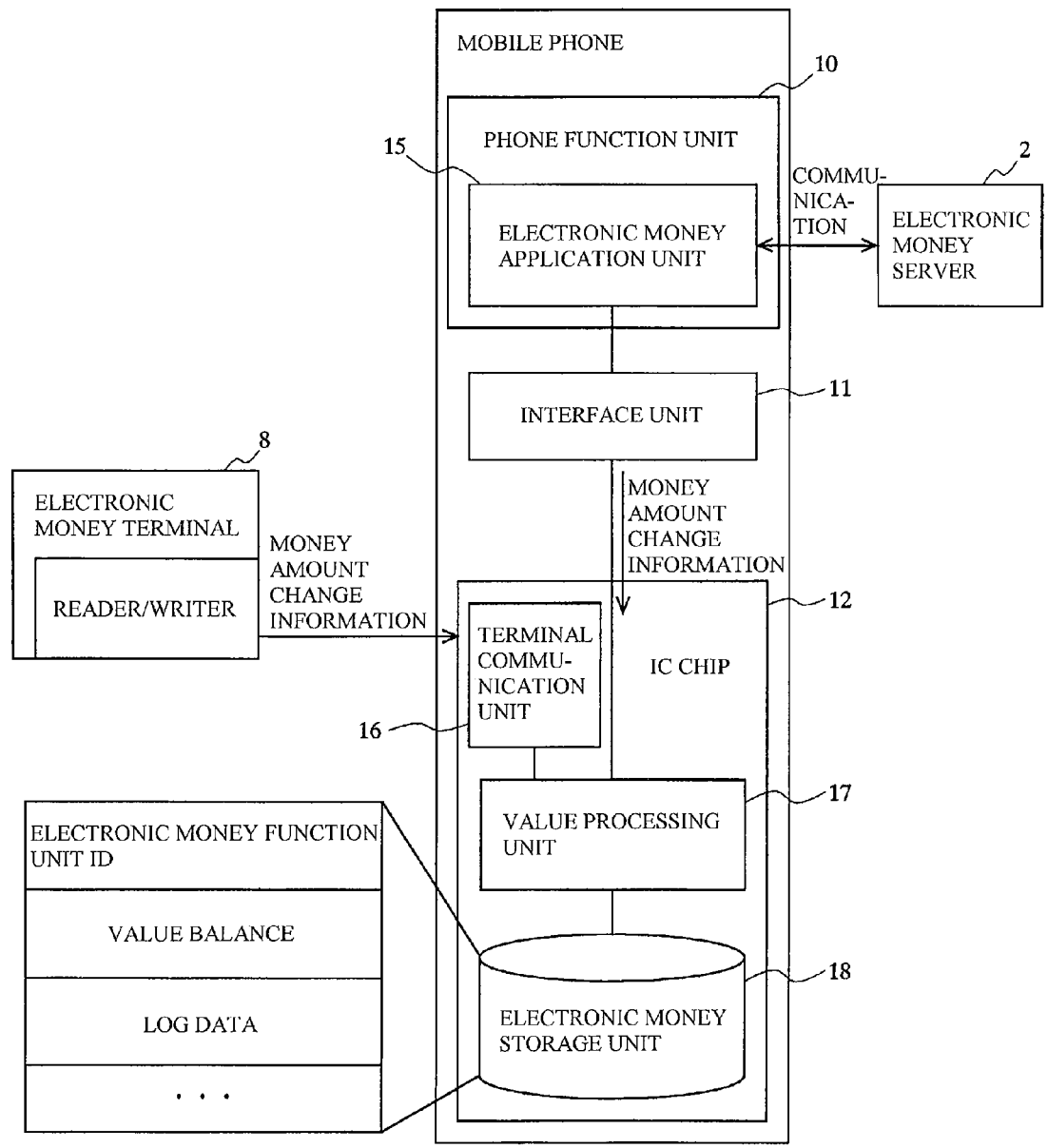
FIG. 3 is a conceptual view for explaining a configuration of a mobile phone.

FIG. 3 is a conceptual view showing an example of a configuration of the mobile phone 7. The parent mobile phone 31 or the child mobile phone 32 has the same configuration.

The mobile phone 7 includes a phone function unit 10 and an IC chip 12, and they are connected with each other through an interface unit 11.

In the IC chip 12, a terminal communication unit 16, a value processing unit 17, an electronic money storage unit 18, and others are formed.

The electronic money storage unit 18 stores, an electronic money function unit ID, a value balance, log data, an others.

The electronic money function unit ID is identification information that specifies the IC chip 12 in the electronic money system 1.

The value balance is an amount of the currently stored value, and the IC chip 12 can perform settlement processing by reducing this value at, e.g., the electronic money terminal 8 installed in a store.

The log data is log data having value processing contents and others recorded therein, and it includes a date, hours, minutes, and seconds of processing, a charge amount, a settlement amount, and others.

The terminal communication unit 16 mediates communication between the electronic money terminal 8 and the value processing unit 17 by, e.g., receiving a later-described ID reference command, money amount change information, or any other commands from the reader/writer of the electronic money terminal 8 and inputting them to the value processing unit 17.

The value processing unit 17 can communicate with the electronic money terminal 8 through the terminal communication unit 16 and can communicate with the electronic money server 2 through the phone function unit 10.

Furthermore, the value processing unit 17 can be connected with the user terminal 9 (FIG. 2) through the terminal communication unit 16 to communicate with the electronic money server 2.

Moreover, the value processing unit 17 receives various kinds of commands from the electronic money terminal 8 or the electronic money server 2 and executes these commands.

The commands include the money amount change information, the ID reference command, a balance reference command, and others.

As the money amount change information, there are decrease information for decreasing the value and increase information for increasing the value as explained above.

Additionally, the value processing unit 17 increases the value in the electronic money storage unit 18 by an amount specified in the increase information when the increase information is input, and it decreases the value in the electronic money storage unit 18 by an amount specified in the decrease information.

Therefore, the electronic money server 2 can transmit the decrease information to the value processing unit 17 in the parent mobile phone 31 to perform the family settlement, and can transmit the increase information to the value processing unit 17 in the child mobile phone 32 to effect the family charge.

The ID reference command is a command that allows the value processing unit 17 to read an electronic money function unit ID, and the value processing unit 17 reads the electronic money function unit ID from the electronic money storage unit 18 and outputs it when the ID reference command is input.

Therefore, the electronic money server 2 can transmit the ID reference command to the parent mobile phone 31 and the child mobile phone 32 to acquire their electronic money function unit IDs, thereby confirming whether they are the parent mobile phone 31 and the child mobile phone 32 subjected to the family registration.

The balance reference command is a command that allows the value processing unit 17 to read the value, and the value processing unit 17 reads the value from the electronic money storage unit 18 and outputs it when the balance reference command is input.

Therefore, the electronic money server 2 can transmit the balance reference command to the parent mobile phone 31 to acquire the value stored in the parent mobile phone 31, thereby selecting a conformation (e.g., whether the family settlement is performed by using the parent mobile phone 31 or credit issued from the credit server 61 is used) of the later-explained family charge.

The phone function unit 10 has a call mode that a telephone call is made and an application mode, and these modes can be switched by an operation from a user.

The phone function unit 10 has a CPU and a storage unit storing various kinds of application programs, and various application functions can be exercised by executing these application programs by the CPU in the application mode.

An electronic money application unit 15 is formed by executing an electronic money application program by the CPU in the phone function unit 10.

The electronic money application unit 15 can access both the electronic money server 2 and the IC chip 12 and mediate communication between the electronic money server 2 and the IC chip 12.

The electronic money application unit 15 is connected with the IC chip 12 through the interface unit 11, and it can access a service site provided by the electronic money server 2 or can mediate communication between the electronic money server 2 and the IC chip 12.

Therefore, a user can use the electronic money application unit 15 to access the service site of the electronic money server 2 and to apply for the family charge, and then the electronic money server 2 can access the IC chip 12 to carry out the family charge.

Figure 4:
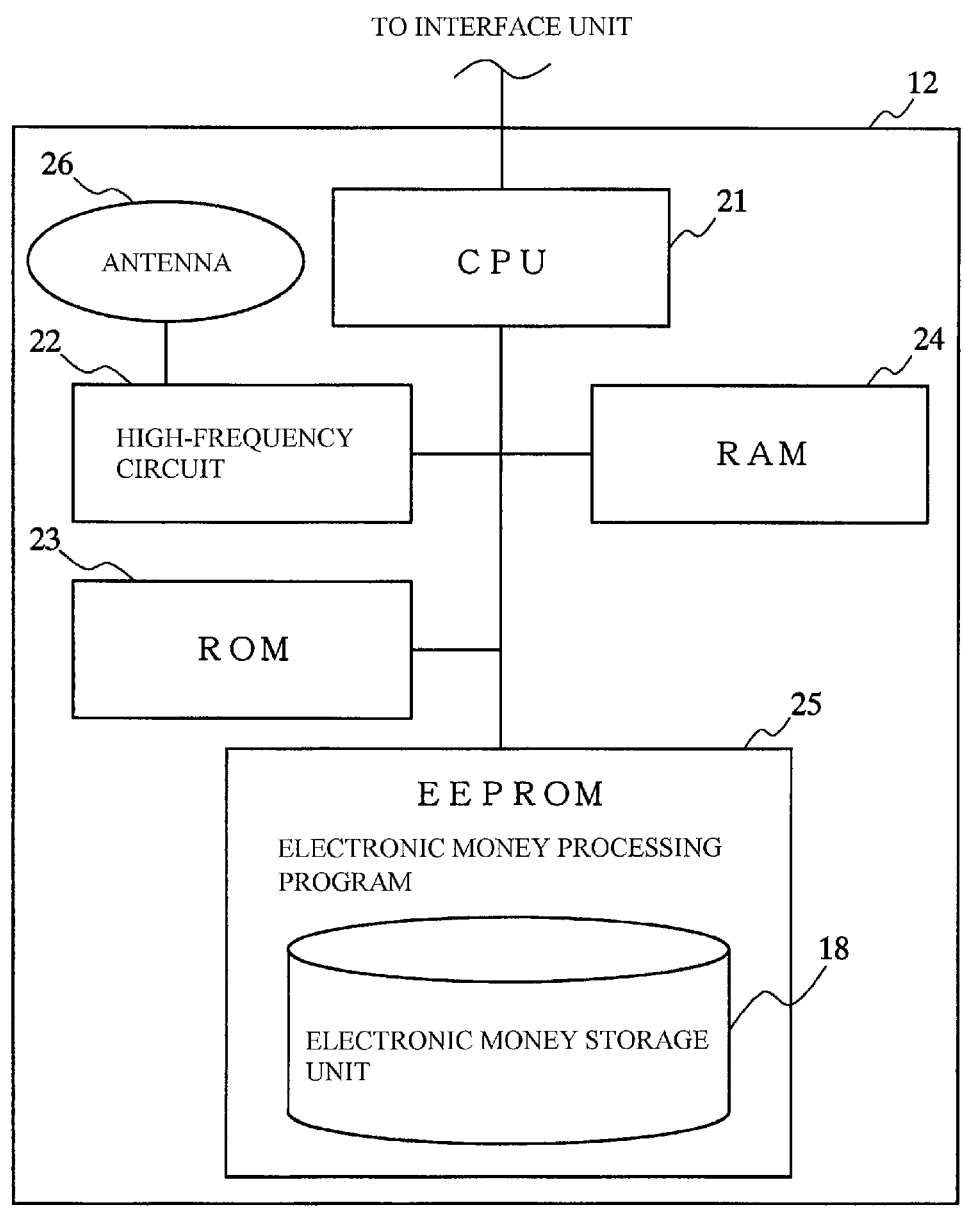
FIG. 4 is a block diagram showing an example of a hardware configuration of an IC chip.

FIG. 4 is a block diagram showing an example of a hardware configuration of the IC chip 12.

The IC chip 12 has a CPU (Central Processing Unit) 21, a high-frequency circuit 22, an antenna 26, a ROM (Read Only Memory) 23, a RAM (Random Access Memory) 24, an EEPROM (Electronically Erasable and Programmable ROM) 25, and others.

These elements are formed on the IC chip 12 and function as a monetary terminal storing a balance (the value) of a monetary value (the value) as explained above.

However, the antenna 26 is formed of an aerial wire stretched near an outer edge portion in the IC card 6 or on an elliptic curve having a diagonal line of the IC card 6 as an axis, and an end portion thereof is connected with the IC chip 12.

The CPU 21 is a central processing unit that performs information processing in accordance with various kinds of programs stored in the ROM 23 or the EEPROM 25.

The CPU 21 can perform near field communication with the electronic money terminal 8 or the user terminal 9 through the antenna 26 or the high-frequency circuit 22.

The antenna 26 is an antenna that is used to effect transmission/reception with respect to a built-in antenna in, e.g., the reader/writer of the electronic money terminal 8 through electronic waves, and it transmits/receives various kinds of information and generates electric power that is used to drive the IC chip 12 through electric waves from the electronic money terminal 8.

The high-frequency circuit 22 converts a high frequency transmitted from the reader/writer to the antenna 26 into a digital signal to be output to the CPU 21, or it converts a digital signal output from the CPU 21 into a high frequency to be transmitted to the electronic money terminal 8 or the like from the antenna 26.

The RAM 24 is a continually writable/readable memory that provides a working memory when the CPU 21 executes information processing.

In this embodiment, when the CPU 21 communicates with the electronic money terminal 8 or increases/decreases the value, the RAM 24 is used as a temporary storage region.

The ROM 23 is a read-only memory storing basic programs, parameters, or data that allow the IC card 6 to function.

The EEPROM 25 is a ROM into/from which information can be written/erased. Information stored in the EEPROM 25 is maintained even though electric power is not supplied to the IC card 6.

The EEPROM 25 stores a monetary terminal program that allows the IC chip 12 to exercise its function as a monetary terminal, and it also has an electric money storage unit 18 storing various kinds of data such as an electric money function unit ID, a value balance, or log data formed therein.

When the CPU 21 executes the monetary terminal program, the value processing unit 17 (FIG. 3) is formed.

Although not shown, the IC card 6 has the built-in IC chip 12 therein, and the IC chip 12 has the same configuration as the IC chip 12 in the mobile phone 7 except that it is not connected with the phone function unit 10 (FIG. 3).

Figure 5:
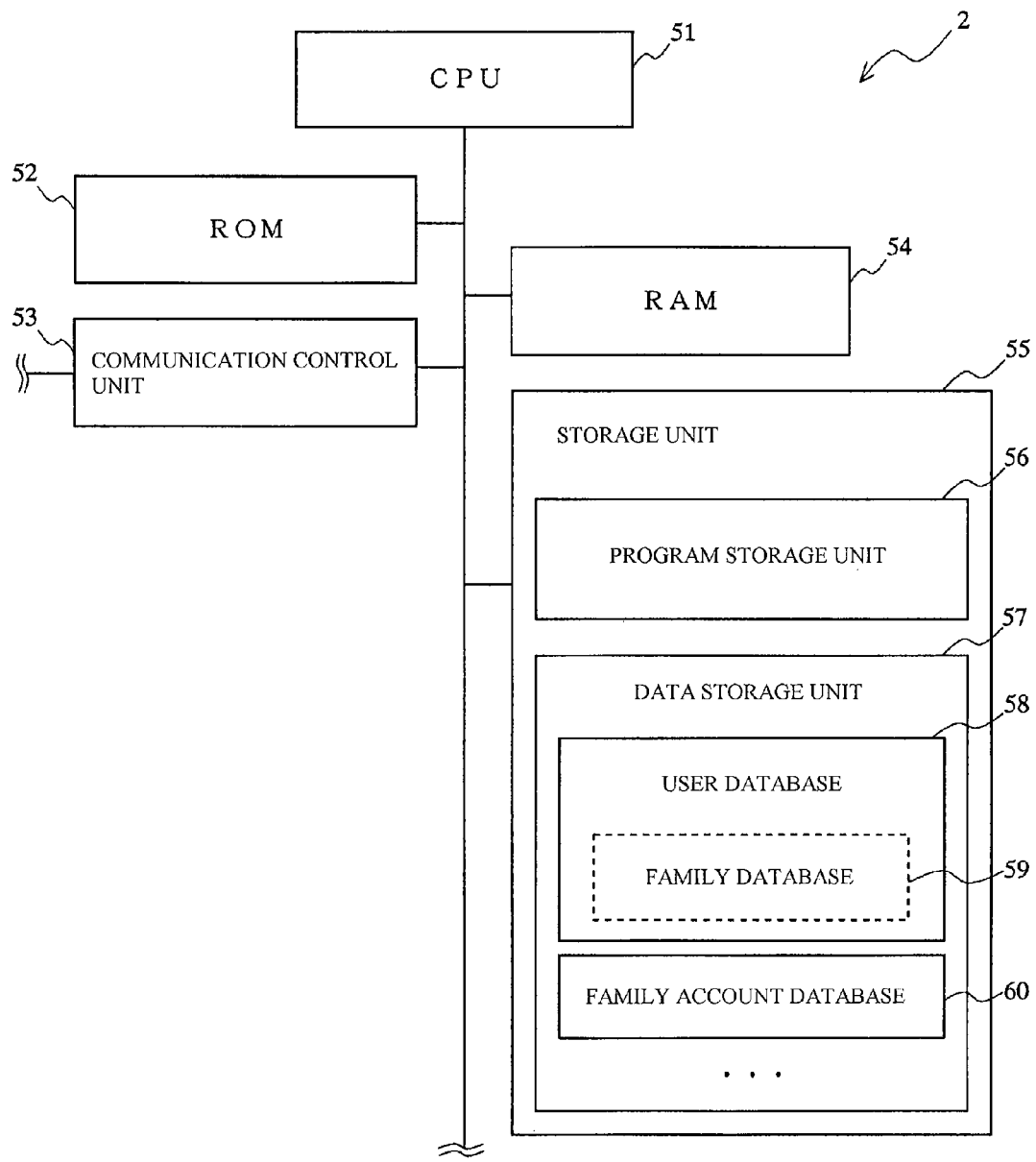
FIG. 5 is a view showing an example of a hardware configuration of an electronic money server.

FIG. 5 is a view showing an example of a hardware configuration of the electronic money server 2.

The electronic money server 2 includes a CPU 51, a ROM 52, a RAM 54, a communication control unit 53, a storage unit 55, and others that are connected through a bus line.

The CPU 51 is a central processing unit that executes various kinds of information processing in accordance with a predetermined program.

In this embodiment, the CPU 51 collects utilization log data from the electronic money terminal 8 to perform aggregate calculation, or it carries out the family registration with respect to users of the parent mobile phone 31 or the child mobile phone 32 to provide a family charge service.

Furthermore, the CPU 51 manages a service site that provides the family charge service or other services, or it transmits electronic mails to the parent mobile phone 31 or the child mobile phone 32.

It is to be noted that all these functions do not have be executed by the CPU 51, and a plurality of server devices may be combined to constitute a system having functions equivalent to those of the electronic money server 2.

The ROM 52 is a read-only memory, and it stores basic programs or parameters that are used to operate the electronic money server 2.

The RAM 54 is a readable/writable memory, and it provides a working memory for the CPU 51 or loads programs or data stored in the storage unit 55 and stores them therein.

The communication control unit 53 is a control unit that communicates with the electronic money terminal 8 or communicates with the mobile phone 7, the parent mobile phone 31, or the child mobile phone 32 through the base station 5.

The storage unit 55 is constituted by using a high-capacity memory device such as a hard disk, and it includes a program storage unit 56 storing various kinds of programs, a data storage unit 57 storing data, and others.

The program storage unit 56 stores an OS as a basic program that allows the electronic money server 2 to function, a program that is used by the CPU 51 to provide the family charge service, and other programs.

The data storage unit 57 stores a user database 58, a family account database 60, a non-illustrated utilization log database, and others.

The user database 58 has users of the mobile phone 7 and the IC card 6 registered therein, and a family database 59 storing family information is formed by grouping these users based on the family registration in the user database 58.

The family database 59 includes family information having such as a logical configuration as depicted in FIG. 6.

It is to be noted that the user database 58 is formed of, e.g., a so-called relational database, and a logical configuration obtained by extracting items subjected to the family registration from the user database 58 forms the family database 59.

The family database 59 is formed of a "family ID", a "family password", a "family account number", an "electronic money function unit ID", a "family relationship", an "electronic mail address", "credit information", "family charge restriction information", and other items.

The "family ID" is identification information that is used by the electronic money server 2 to identify a family group.

The "family password" is a password common to users subjected to the family registration.

The electronic money server 2 can confirm that a user is a group member based on a family password and can specify a family ID by using a family password when it receives the family password from the parent mobile phone 31 or the child mobile phone 32.

The "family account number" is an account number of a family account. Although particulars will be explained later, the family account is a value savings account opened in the electronic money server 2 in association with a family group, and the value generated based on, e.g., credit of the parent is stored in this account.

The child mobile phone 32 can be subjected to the family charge by downloading the value from the family account.

The "electronic money function unit ID" is an electronic money function unit ID given to the IC chip 12 of the mobile phone 7 (the parent mobile phone 31, the child mobile phone 32, . . . ) owned by each constituent member of the family group.

The electronic money server 2 acquires the electronic money function unit ID from the parent mobile phone 31 or the child mobile phone 32 when performing the family charge or the family settlement, and collates this ID with IDs registered in the "electronic money function unit ID" for confirmation.

The "family relationship" corresponds to discrimination of a person who defrays a cost caused due to the family charge from a person who carries out the family charge, i.e., discrimination of a representative from a regular person.

The "electronic mail address" is an electronic mail address that is used by the electronic money server 2 to transmit an electronic mail to the parent mobile phone 31 or the child mobile phone 32.

The "credit information" is information that is used by the credit server 61 to authenticate a representative when requesting the credit server 61 to issue credit to the representative, and it includes, e.g., a credit number, a security code, and others.

As will be explained later, the electronic money server 2 uses an electronic mail address of the parent mobile phone 31 to make settlement of a cost for the family charge when the parent mobile phone 31 is used to perform the family settlement and effect the family charge, and the electronic money server 2 uses the credit information to make settlement of a cost for the family charge when the family charge is performed based on credit, and hence both the electronic mail address of the parent mobile phone 31 an the credit information function as intrinsic information that is used to make settlement of the cost for the family charge by the representative. Furthermore, the electronic mail address also functions as transmission destination information for a settlement terminal (the parent mobile phone 31).

The "family charge restriction information" is a restrictive condition set by a representative in order to prevent the child mobile phone 32 from unlimitedly performing the family charge from the parent mobile phone 31.

Specifically, an upper limit amount that enables performing the family charge, i.e., "up to 3,000 yen per month" or "up to 1,000 yen each time" can be set.

It is to be noted that, besides, various kinds of information required to provide the family charge service such as a private password that is used to authenticate each person, e.g., the parent or the child or a distribution amount (which will be explained later) when the value is distributed to the child mobile phone 32 are registered in the family database 59.

Further, a fixed number in a family group is set by an enterprise of the electronic money system 1 for the reason of management.

As explained above, the family database 59 functions as correspondence storing means for storing intrinsic information (an electronic mail address and credit information of the parent mobile phone 31) that is used to make the settlement by a representative and a mobile terminal owned by a regular person in association with each other in regard to a group including the representative and the regular person, and also functions as restrictive condition storing means for storing restrictive conditions (family charge restriction information) when transmitting increase information to the mobile terminal.

Various conformations of provision of the family charge service will now be described with reference to a flowchart.

It is to be noted that, since various operating conformations of the family charge service can be utilized, major ones in these conformations will be explained, but the enterprise that manages the electronic money system 1 determines a conformation to be adopted.

A configuration that a representative (e.g., the parent) and a regular person (e.g., the child) are grouped and the mobile phone 7 of the regular person is charged online to the representative's cost is common to all the conformations.

Figure 7:
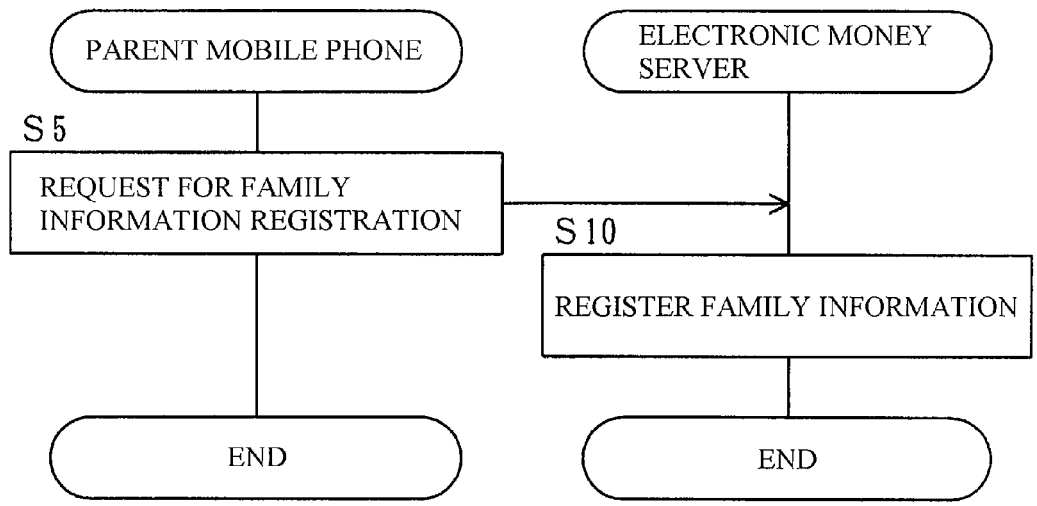
FIG. 7 is a flowchart for explaining a family registration procedure.

A procedure of performing the family charge will be first explained with reference to a flowchart of FIG. 7.

First, the parent accesses a screen on which the family registration at a service site of the electronic money server 2 is performed from the parent mobile phone 31.

Further, the parent inputs necessary information, e.g., information concerning the child mobile phone 32 in this screen, and then performs an operation of transmitting the input information.

Then, the parent mobile phone 31 generates family registration information including the input information and transmits the generated information to the electronic money server 2 (a step 5).

The electronic money server 2 receives the family registration information from the parent mobile phone 31, registers this information in the family database 59 (a step 10), and sets a family group including this parent as a representative.

It is to be noted that, in the electronic money server 2, the parent has an authority to perform the family registration so that the child cannot register himself/herself as a family without the parent's permission or cannot change registered information.

A procedure of performing the family charge in the electronic money system 1 will now be described.

Although there are various conformations of the family charge, transfer of the value from the parent mobile phone 31 to the child mobile phone 32 as a basic conformation will be first described with reference to a flowchart of FIG. 8.

First, the child accesses a screen on which he/she applies for the family charge at the service site of the electronic money server 2 from the child mobile phone 32, inputs necessary information from this screen, and clicks a transmission button.

Then, the child mobile phone 32 generates family charge request information including the input information and transmits the generated information to the electronic money server 2 (a step 15).

The family charge request information includes a family password, an electronic money function unit ID of the child mobile phone 32, a charge amount, information that specifies a representative specified by the child when there are a plurality of representatives, and others.

The electronic money server 2 receives the family charge request information from the child mobile phone 32. As explained above, the electronic money server 2 includes increase request accepting means for accepting a request to increase a monetary value (the value) by a predetermined money amount (a charge amount) from the mobile terminal (the child mobile phone 32).

Upon receiving the family charge request information, the electronic money server 2 retrieves family information to confirm the parent and the child as targets of the family charge service (a step 20).

Figure 8:
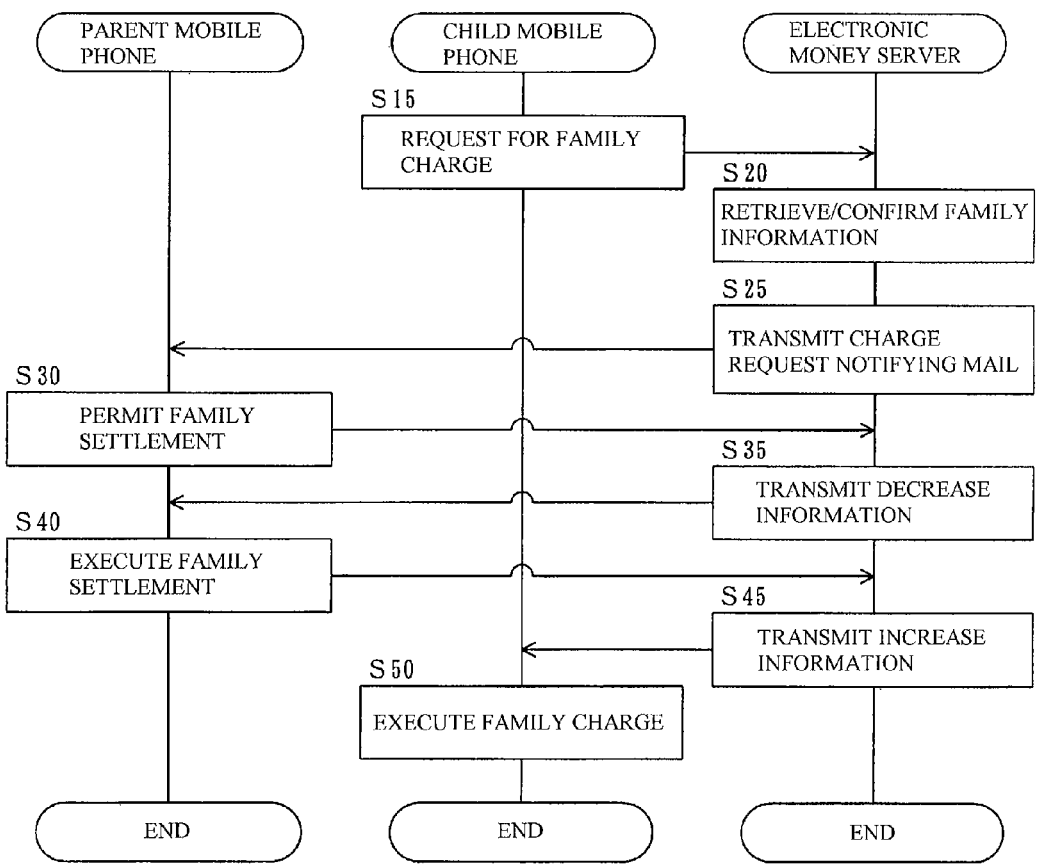
FIG. 8 is a flowchart for explaining a procedure of performing family charge by transferring a value from a parent mobile phone to a child mobile phone.

It is to be noted that, although not shown in FIG. 8, the electronic money server 2 can accept a message, e.g., "please give me the value for 500 yen because I want to download a game" when receiving a charge request from the child mobile phone 32, and can transmit this message to the parent mobile phone 31 simultaneously with a charge request notifying mail. As a result, the parent can be aware of a purpose of the value and determine whether he/she grants permission.

It is to be noted that a function of returning a message, e.g., "you cannot have it any further this month" or "OK, I will send you right away" from the parent mobile phone 31 to the child mobile phone 32 can be implemented in the electronic money server 2. In more detail, the electronic money server 2 specifies a family ID (i.e., a family group) from a family password, specifies the child mobile phone 32 as a execution target of the family charge and the child who owns this mobile phone from an electronic money function unit ID, and specifies the parent mobile phone 31 as an execution target of the family settlement and the parent from information that specifies a representative.

Further, the electronic money server 2 confirms that the specified child and parent are registered as a representative and a regular person in the specified family group, respectively.

Subsequently, the electronic money server 2 uses an electronic mail address of the representative to transmit a charge request notifying mail to the parent mobile phone 31 (a step 25).

This electronic mail includes information that specifies the child and a money amount requested for the charge, and it requests to perform the family settlement by connecting the parent mobile phone 31 to the electronic money server 2.

As explained above, the electronic money server 2 includes connection request transmitting means for using transmission destination information (an electronic mail address of the parent mobile phone 31) to transmit a connection request to a settlement terminal (the parent mobile phone 31).

Furthermore, the charge request notifying mail also plays a role of requesting the child mobile phone 32 to make payment for a cost of the family charge by using the value in the parent mobile phone 31, and hence the electronic money server 2 includes settlement permission request transmitting means for transmitting a settlement permission request to the settlement terminal (the parent mobile phone 31) by using the transmission destination information (the electronic mail address of the parent mobile phone 31).

Upon receiving the charge request notifying mail, the parent mobile phone 31 urges the parent to see the mail by using, e.g., a ringing tone or vibration.

The parent mobile phone 31 displays the charge request notifying mail in a display by an operation from the parent and urges to select permission or non-permission for the family settlement.

When the parent selects non-permission, the electronic money server 2 transmits a message notifying that the family charge is impossible to the child mobile phone 32, but it is assumed that the parent permits the family settlement in this example.

When the parent selects permission for the family settlement, the parent mobile phone 31 transmits a permission notification to the electronic money server 2 (a step 30).

When the electronic money server 2 receives the permission notification for the family settlement from the parent mobile phone 31, it generates decrease information that is used to decrease the value by a money amount of the family charge and transmits the generated information to the parent mobile phone 31 (a step 35).

In this manner, the electronic money server 2 includes settlement means for making settlement for a predetermined money amount (a charge amount) requested to be increased based on defrayment from a representative by using intrinsic information (an electronic mail address of the child mobile phone 32) associated in family information.

Upon receiving the decrease information from the electronic money server 2, the parent mobile phone 31 uses the received information to perform the family settlement for a corresponding money amount from the value in the parent mobile phone 31 (a step 40).

Furthermore, the parent mobile phone 31 transmits a family settlement completion notification to the electronic money server 2 to notify the electronic money server 2 of completion of the family settlement.

Upon receiving the family settlement completion notification from the parent mobile phone 31, the electronic money server 2 generates increase information that is used to increase the value for the money amount subjected to the family settlement and transmits the generated information to the child mobile phone 32 (a step 45).

As explained above, the electronic money server 2 includes increase information transmitting means for transmitting increase information that is used to increase a monetary value (the value) for a predetermined money amount (a charge amount) requested to be increased to the mobile terminal (the child mobile phone 32).

When the child mobile phone 32 receives the increase information from the electronic money server 2, it uses this information to increase the value by an amount decreased in the parent mobile phone 31 and executes the family charge (a step 50).

As explained above, the electronic money server 2 can execute family charge by transferring the value from the parent mobile phone 31 to the child mobile phone 32.

Figure 9:
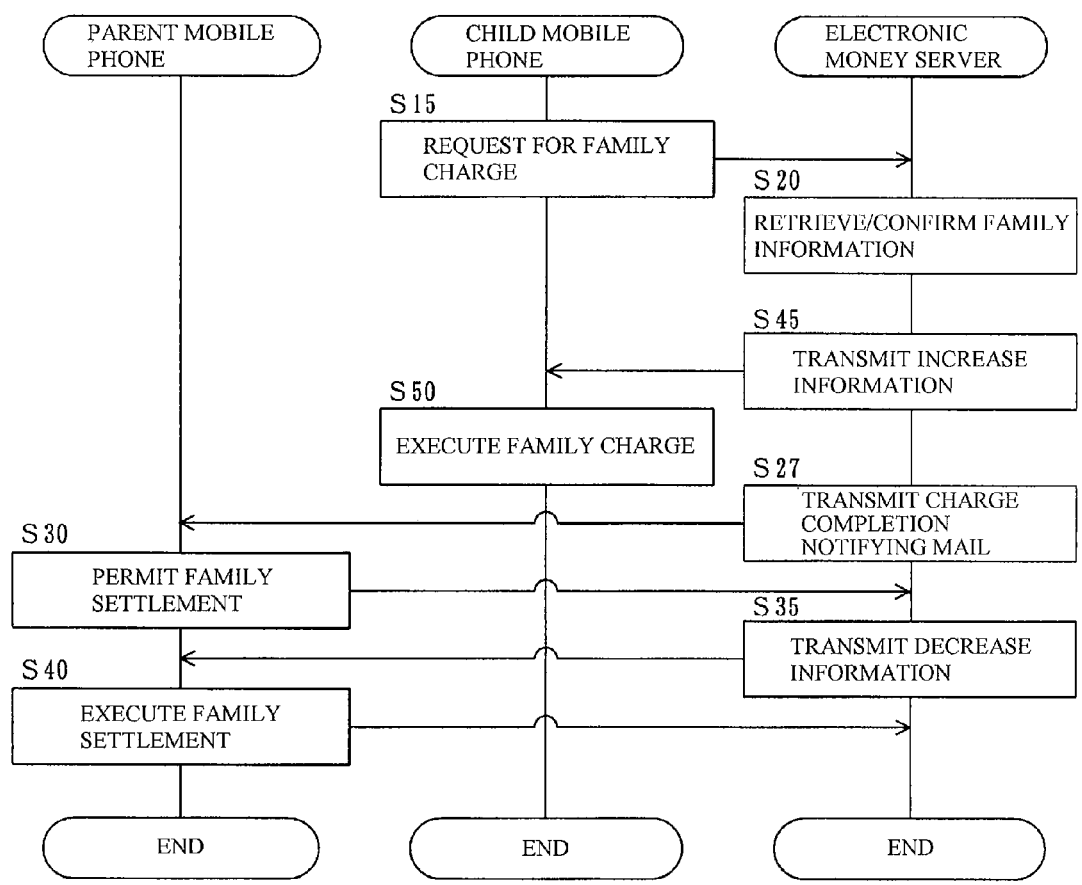
FIG. 9 is a flowchart for explaining a procedure of performing the family charge by transferring the value from the parent mobile phone to the child mobile phone.

Although the family settlement is made and then the family charge is performed in the above example, these operations can be effected in the reversed order as shown in a flowchart of FIG. 9.

It is to be noted that like step numbers denote respective pieces of processing equal to those in FIG. 8, thereby simplifying an explanation.

A step 15 and a step 20 are the same as those in FIG. 8.

Upon receiving a family charge request from the child mobile phone 32, the electronic money server 2 generates increase information for a requested money amount and transmits the generated information to the child mobile phone 32 (a step 45).

The child mobile phone 32 receives this information and executes the family charge (a step 50). When the family charge is completed, the child mobile phone 32 notifies the electronic money server 2 of this completion.

When the child mobile phone 32 receives a notification that the family charge is completed, the electronic money server 2 transmits a charge completion notifying mail to the parent mobile phone 31 (a step 27), notifies the parent that the family charge is completed in the child mobile phone 32, and asks for permission for the family settlement.

When the parent permits the family settlement, the parent mobile phone 31 transmits the family settlement permission to the electronic money server 2 (a step 30).

When the electronic money server 2 receives the family settlement permission, it generates decrease information that is used to decrease the value for a money mount subjected to the family charge in the child mobile phone 32 and transmits the generated information to the parent mobile phone 31 (a step 35).

The parent mobile phone 31 receives the decrease information from the electronic money server 2 and carries out it to perform the family settlement (a step 40).

In this example, the child mobile phone 32 can immediately effect the family charge without waiting for permission from the parent mobile phone 31.

The above has explained the procedure of making the family settlement in the parent mobile phone 31 before subjecting the child mobile phone 32 to the family charge (FIG. 8) and the procedure of making the family settlement in the parent mobile phone 31 after subjecting the child mobile phone 32 to the family charge (FIG. 9), the following conformation in which these procedures are combined can be used.

That is, when the child mobile phone 32 requests for the family charge, the electronic money server 2 asks the parent mobile phone 31 for permission of the family settlement in the parent mobile phone 31 by using, e.g., an electronic mail.

Moreover, when there is a response of permission from the parent mobile phone 31 within N minutes (within a predetermined time), the electronic money serer 2 makes the family settlement in the parent mobile phone 31 and then performs the family charge with respect to the child mobile phone 32.

On the other hand, when there is no response from the parent mobile phone 31 within N minutes, the electronic money server 2 performs the family charge in the child mobile phone 32 and thereafter makes the family settlement in the parent mobile phone 31.

Additionally, when there is a response of non-permission from the parent mobile phone 31, the electronic money server 2 notifies the child mobile phone 32 that the family charge cannot be performed and does not effect the family charge.

Figure 10:
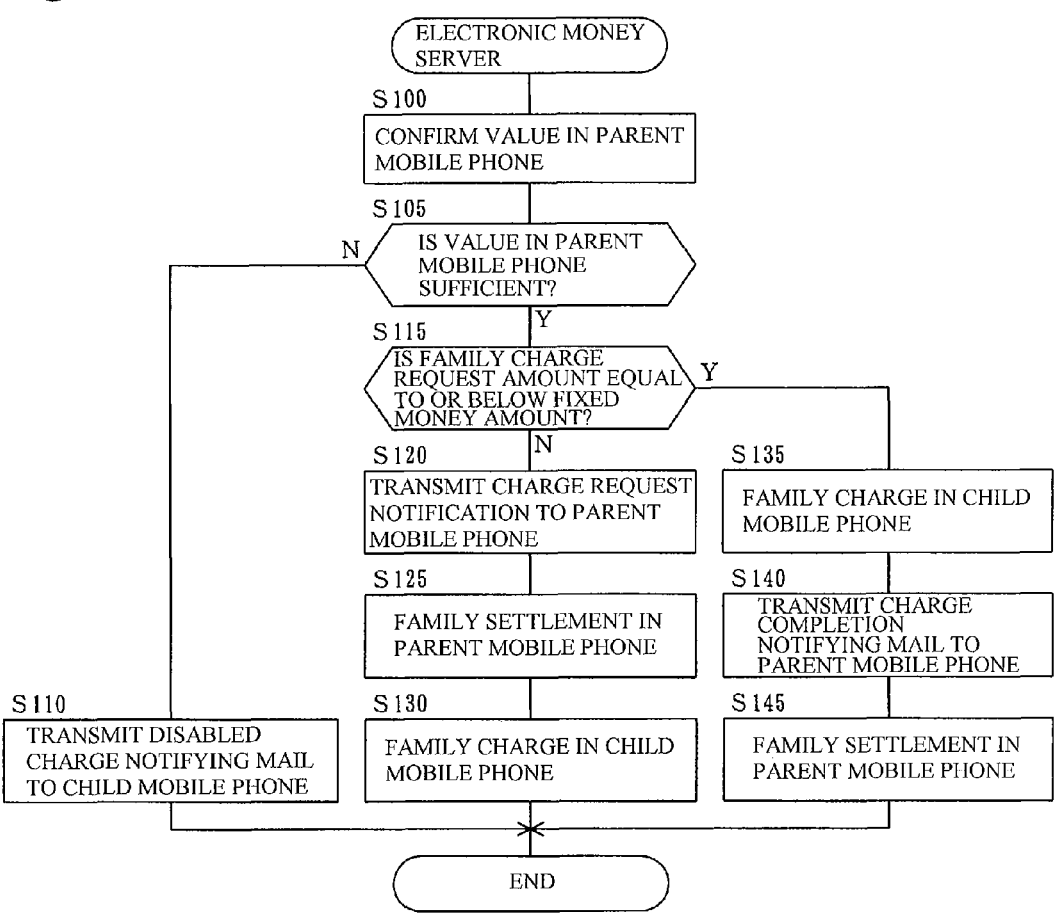
FIG. 10 is a flowchart for explaining a procedure of family charge according to another embodiment.

FIG. 10 is a flowchart for explaining an example of a method for selecting a procedure of the family charge based on a combination of various kinds of conditions.

As will be explained later, the electronic money server 2 can be configured to divaricate processing based on a combination of various kinds of conditions.

As a result, a threshold value is provided for an amount of the family charge, and the family charge can be performed based on the scheme depicted in FIG. 9 when a money amount requested by the child mobile phone 32 is equal to or below this threshold value, whilst the family charge can be carried out based on the scheme depicted in FIG. 8 when the money amount is above the threshold value.

First, when the electronic money server 2 accepts a request for the family charge from the child mobile phone 32, it confirms (a balance of) the value in the parent mobile phone 31 (a step 100).

As this confirmation, an electronic mail may be transmitted to the parent mobile phone 31 to notify the parent, the parent mobile phone 31 may be connected to the electronic money server 2, and then a balance reference command may be transmitted to perform confirmation, or the value in the parent mobile phone 31 recorded in the electronic money server 2 may be confirmed.

As explained above, the electronic money server 2 includes balance confirming means for confirming a balance of a monetary value (the value) in the settlement terminal (the parent mobile phone 31).

It is to be noted that the value in the parent mobile phone 31 recorded in the electronic money server 2 is calculated by tallying utilization log data transmitted on a regular/irregular base, and hence the calculated value may possibly deviate from a current value of the value stored in the parent mobile phone 31.

When the value in the parent mobile phone 31 is not a sufficient money amount with respect to a predetermined reference value which is set in advance (a step 105; N), the electronic money server 2 transmits a disabled charge notifying mail to the child mobile phone 32 (a step 110) to notify that the family charge is impossible.

On the other hand, when the value in the parent mobile phone 31 is sufficient (the step 105; Y), the electronic money server 2 confirms whether a requested money amount for the family charge requested by the child mobile phone 32 is equal to or below a preset fixed money amount (a step 115).

When the requested money amount is equal to or below the fixed money amount (the step 115; Y), the electronic money server 2 first performs the family charge with respect to the child mobile phone 32 (a step 135) and then transmits a charge completion notifying mail to the parent mobile phone 31 (a step 140) to make the family settlement in the parent mobile phone 31 (a step 145).

When the requested money amount is larger than the fixed money amount (the step 115; N), the electronic money server 2 transmits a charge request notifying mail to the parent mobile phone 31 (a step 120), when the parent mobile phone 31 grants permission, the electronic money server 2 makes the family settlement in the parent mobile phone 31 (a step 125), and thereafter performs the family charge in the child mobile phone 32 (a step 130).

Figure 11:
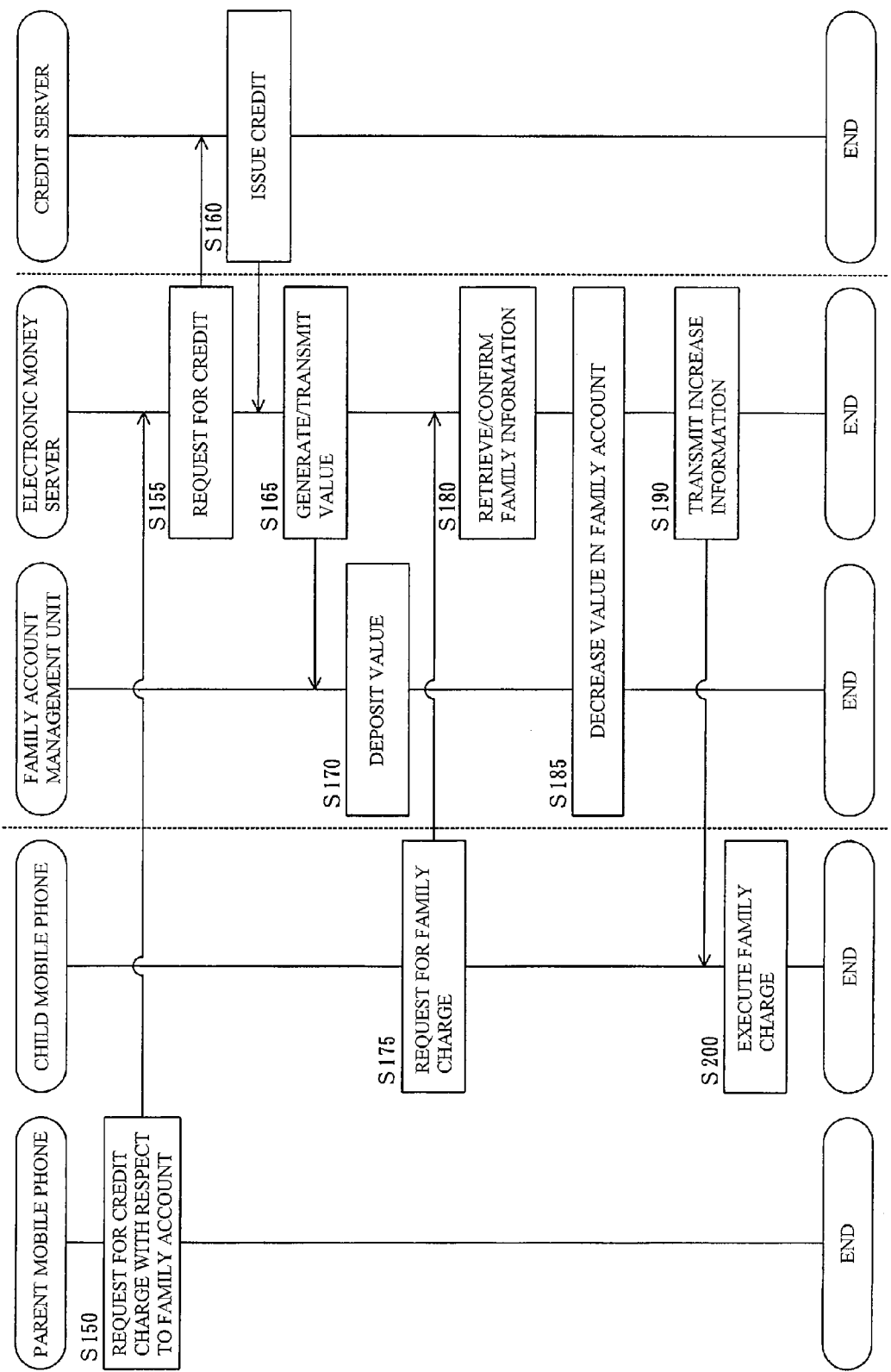
FIG. 11 is a flowchart for explaining a procedure of performing the family charge on credit.

A procedure of depositing the value in a family account and thereby performing the family charge by the electronic money server 2 will now be described with reference to a flowchart of FIG. 11. The family account functions as monetary value storing means for storing a monetary value (the value) generated by using credit of a representative in advance.

A user can select a scheme of performing the family charge based on credit of the representative like the following scheme in place of the above-explained scheme of transferring the value from the parent mobile phone 31 to the child mobile phone 32. First, the parent mobile phone 31 accesses the service site of the electronic money server 2 and specifies a money amount to request the charge based on credit to the family account (a step 150).

Upon accepting the request for the charge based on credit to the family account from the parent mobile phone 31, the electronic money server 2 uses credit information of the parent to request the credit server 61 to issue credit corresponding to a money amount of the charge (a step 155).

When the credit server 61 accepts the credit issue request from the electronic money server 2, it examines about this request and notifies the electronic money server 2 of the credit issue (a step 160).

Further, the electronic money server 2 receives notification of the credit issue from the credit server 61.

As explained above, the electronic money server 2 includes credit acquiring means for acquiring credit of a representative from the credit server 61 by using credit information.

When the electronic money server 2 accepts the credit from the credit server 61, it generates the value (a step 165) and transmits it to a family account management unit (a step 165).

Here, the family account management unit is a function unit provided in the electronic money server 2 to manage the family account.

When the electronic money server 2 generates the value, the family account management unit deposits the generated value into the family account (a step 170).

The value can be stored in the family account like a regular savings account, and the value can be deposited or drawn by using the family account management unit.

When the value is deposited in the family account in this manner and the child mobile phone 32 requests the electronic money server 2 for the family charge (a step 175), the electronic money server 2 retrieves family information in the family database 59 to confirm the child mobile phone 32 and a family group of the child mobile phone 32 (a step 180).

Furthermore, the electronic money server 2 uses the family account management unit to decrease the value corresponding to a family charge amount from the family account of the corresponding family group (a step 185).

Then, the electronic money server 2 generates increase information and transmits this information to the child mobile phone 32 (a step 190), and the child mobile phone 32 uses this increase information to execute the family charge (a step 200).

As explained above, since the value stored in the family account of the electronic money server 2 is downloaded to the child mobile phone 32 in this pattern, the family charge can be rapidly carried out without confirming with the parent mobile phone 31.

It is to be noted that a configuration that the family charge is performed with respect to the child mobile phone 32 and then the value in the family account is reduced can be adopted. In this case, the family charge with respect to the child mobile phone 32 can be more rapidly carried out.

It is to be noted that, when the child mobile phone 32 asks for the charge with respect to the family account, a charge request permission mail may be transmitted to the parent mobile phone 31 and the family charge may be permitted after granting permission.

Figure 12:
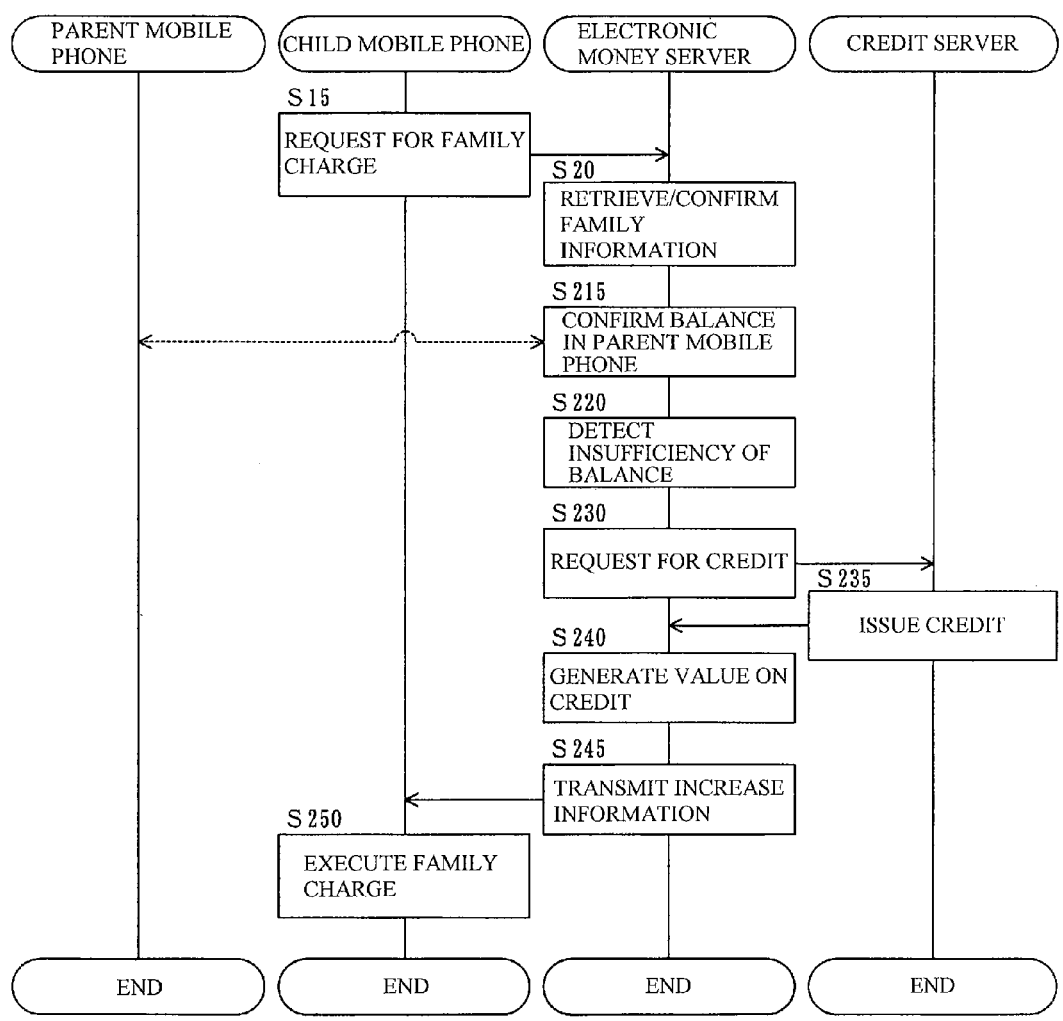
FIG. 12 is a flowchart for explaining another procedure of performing the family charge on credit.

An example of performing the charge on credit when the parent mobile phone 31 does not have the sufficient value will now be explained with reference to a flowchart of FIG. 12.

First, a procedure of asking the electronic money server 2 for the family charge by the child mobile phone 32 (a step 15) and retrieving/confirming family information by the electronic money server 2 (a step 20) is the same as that in FIG. 8.

When the electronic money server 2 receives the family charge request from the child mobile phone 32, it confirms a balance of the value stored in the parent mobile phone 31 (a step 215).

As this confirmation, a confirmation mail may be transmitted to the parent mobile phone 31 to connect the parent mobile phone 31 to the electronic money server 2 and a balance reference command may be transmitted to perform confirmation, or the balance may be calculated by tallying utilization log data stored in the electronic money server 2.

When the electronic money server 2 detects that the balance of the value is insufficient (a step 220), it requests the credit server 61 to issue credit corresponding to a money amount required in the family charge (a step 230).

It is to be noted that a credit permission notifying mail may be transmitted to the parent mobile phone 31 when requesting the credit issue and the credit issue request may be permitted only when there is a permission response.

When the credit server 61 receives the credit issue request from the electronic money server 2, it examines about this request, issues the credit (a step 235), and notifies the electronic money server 2.

When the electronic money server 2 receives the credit issue notification from the credit server 61 (credit acquiring means), it generates the value based on this credit (a step 240).

Further, the electronic money server 2 generates increase information that is used to increase a money amount of this value and transmits the generated information to the child mobile phone 32 (a step 245).

The child mobile phone 32 receives this increase information and uses this information to execute the family charge (a step 250).

As explained above, in this example, when the value in the parent mobile phone 31 is insufficient, the child mobile phone 32 can be charged on credit of the parent.

That is, when a predetermined condition (insufficiency of the value in the parent mobile phone 31) is met, the electronic money server 2 makes settlement of a cost for the family charge based on the credit acquired from the credit server 61.

It is to be noted that transfer of the value from the parent mobile phone 31 is a presupposition and the family charge based on credit is performed when this transfer is difficult in this example, but an operation of a system premised on the charge on credit alone without making the family settlement in the parent mobile phone 31 is also possible.

Figure 13:
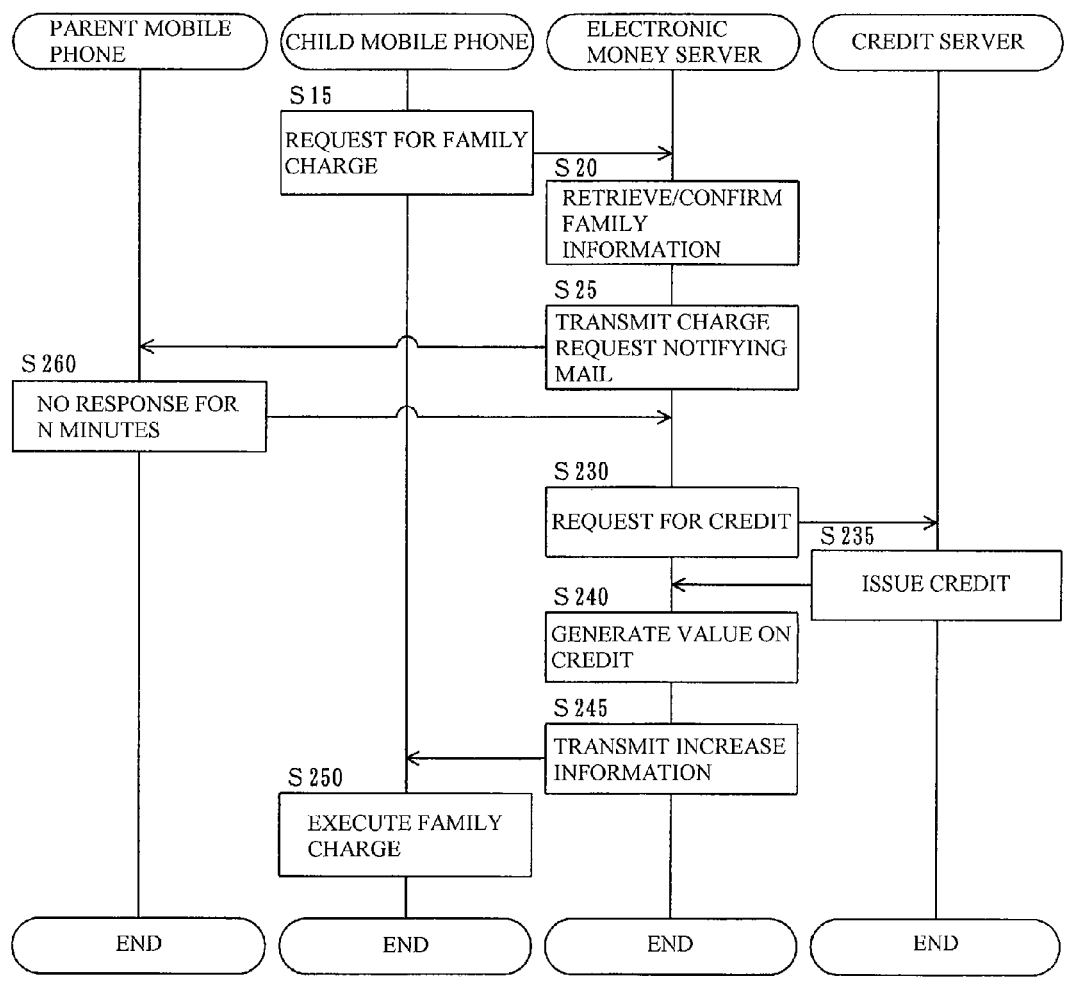
FIG. 13 is a flowchart for explaining a procedure of the family charge when there is no response from the parent mobile phone.

A procedure of performing the family charge on credit when no response is returned even though the parent mobile phone 31 was asked for family settlement permission will now be described with reference to a flowchart of FIG. 13.

In this case, when a predetermined condition is met (no response from the parent mobile phone 31), the electronic money server 2 makes settlement of a cost for the family charge on the credit acquired from the credit server 61.

A step 15 to a step 25 are the same as those in FIG. 8.

When there is no response from the parent mobile phone 31 with respect to a charge request notifying mail in preset N minutes (in a predetermined time) (a step 260), the electronic money server 2 performs the family charge on credit of the parent. Its procedure is the same as the steps 230 to 250 depicted in FIG. 12.

Even when the parent cannot make a response because of, e.g., a conference in this manner, the child can carry out the family charge on credit of the parent.

Figure 14:
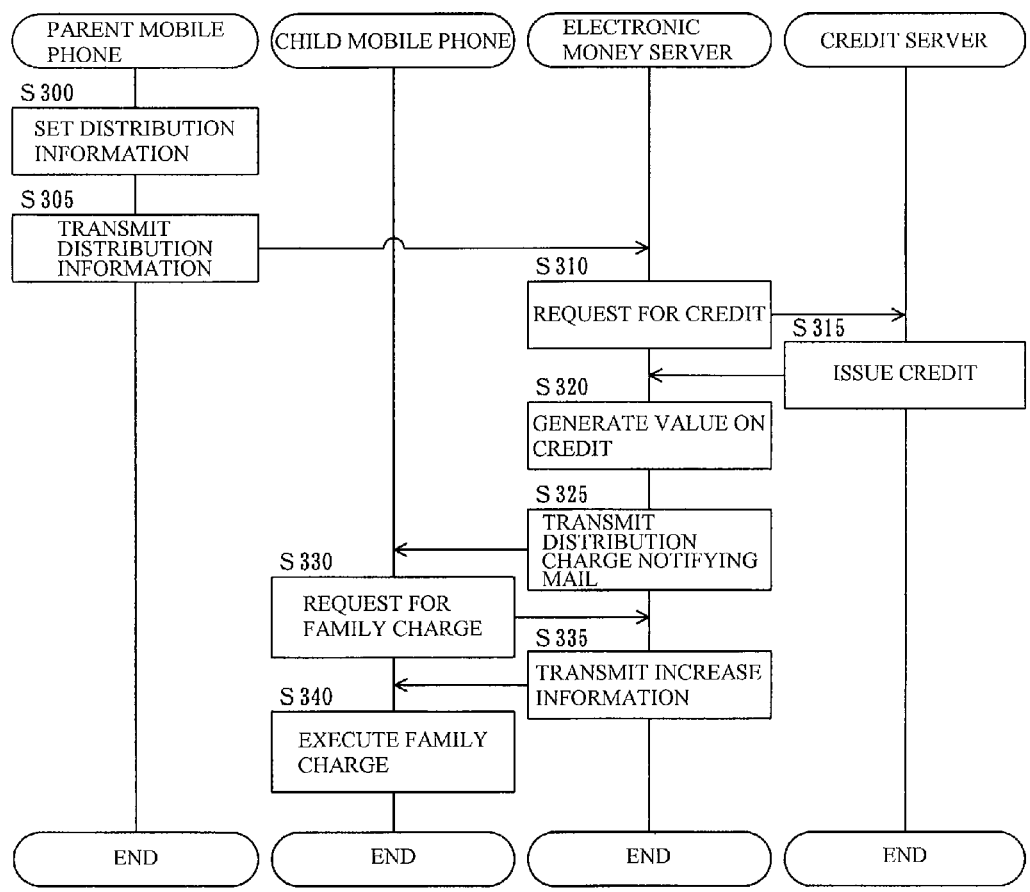
FIG. 14 is a flowchart for explaining a procedure of distributing a value on credit.

An example that the parent uses his/her credit to distribute the value to the child will now be explained with reference to a flowchart of FIG. 14.

First, the parent accesses a screen on which distribution is set at the service site of the electronic money server 2 from the parent mobile phone 31.

The parent mobile phone 31 accepts a setting of distribution information from the screen where the distribution is set by the parent (a step 300) and transmits this information to the electronic money server 2 (a step 305). The distribution information includes a date and hour of distribution, a distribution money amount for each child, and others.

The electronic money server 2 receives the distribution information from the parent mobile phone 31 and stores it in the database.

Furthermore, when the date and hour set in the distribution information is reached, the electronic money server 2 requests the credit server 61 to issue credit (a step 310), and the credit server 61 issues the credit after examination upon receiving the request from the electronic money server 2 (a step 315).

When the credit is issued, the electronic money server 2 generates the value based on this credit (a step 320).

Moreover, the electronic money server 2 uses the family account management unit to deposit the generated value.

It is to be noted that the family account is divided in accordance with each child (each child mobile phone 32) in this example, and the electronic money server 2 uses the family account management unit to distribute the generated value to an account of each child in accordance with a distribution amount specified in the distribution information. This distribution amount may be calculated by using, e.g., a predetermined distribution ratio set by the parent.

As explained above, the monetary value storing means (the family account) can store a monetary value (the value) in accordance with each portable terminal (the child mobile phone 32), and the electronic money server 2 includes distributing means for distributing a monetary value (the value) generated on credit to each portable terminal (the child mobile phone 32) based on a preset distribution amount and storing the same in the monetary value storing means (the family account).

After distributing the value to each child in this manner, the electronic money server 2 transmits a distribution charge notifying mail to the child mobile phone 32 to inform that the family charge is ready (a step 325).

When the child mobile phone 32 requests the family charge upon receiving this notification (a step 330), the electronic money server 2 generates increase information that is used to increase the value in a portion divided to the corresponding child mobile phone 32 and transmits the generated information to the child mobile phone 32 (a step 335).

The child mobile phone 32 receives the increase information from the electronic money server 2 and uses this information to execute the family charge (a step 340).

The above-explained example is convenient when used in a case where the parent gives the child some spending money.

An example that a date and hour is set to reserve the family charge will now be explained with reference to a flowchart of FIG. 15.

First, the child accesses the service site of the electronic money server 2 from the child mobile phone 32 to display a reservation screen.

Furthermore, the child mobile phone 32 accepts a setting of reservation information from the child (a step 350), and transmits this setting to the electronic money server 2 (a step 355).

The reservation information includes a family password, a money amount for the family charge, a date and hour for the family charge, and others.

As explained above, the electronic money server 2 includes transmission date and hour accepting means for accepting a setting of a date and hour for transmission of increase information from the portable terminal.

Upon receiving the reservation information from the child mobile phone 32, the electronic money server 2 stores this information in the database (a step 360) and transmits a charge reservation request notifying mail to the parent mobile phone 31 (a step 365).

This electronic mail notifies the parent that the child has reserved the family charge and inquires about permission/non-permission for the family settlement.

When the parent does not permit the family settlement, the electronic money server 2 transmits a notification indicative of this fact to the child mobile phone 32 and does not perform the family charge.

In this example, it is assumed that the parent permits the family settlement.

When the parent notifies the electronic money server 2 that the family settlement is permitted from the parent mobile phone 31 (a step 370), the electronic money server 2 generates decrease information that is used to decrease the value corresponding to a money amount for the family charge and transmits the generated information to the parent mobile phone 31 (a step 375).

The parent mobile phone 31 receives this decreases information and uses this information to execute the family settlement (a step 380).

Moreover, the parent mobile phone 31 notifies the electronic money server 2 of completion of the family settlement.

When the family settlement is completed in the parent mobile phone 31, the electronic money server 2 monitors whether the reserved time has come, and continues monitoring when it has not come (a step 385; N).

On the other hand, when the reserved time has come (the step 385; Y), the electronic money server 2 transmits an enabled charge notifying mail to the child mobile phone 32 (a step 390) and notifies the child that the family charge is possible.

Upon receiving this notification, the child requests the electronic money server 2 for the family charge from the child mobile phone 32 (a step 395).

The electronic money server 2 generates increase information in response to this request and transmits the generated information to the child mobile phone 32 (a step 400).

The child mobile phone 32 receives the increase information from the electronic money server 2 and uses this information to execute the family charge (a step 405).

In this manner, the electronic money server 2 transmits the decrease information to the settlement terminal (the parent mobile phone 31) until the reserved transmission date and hour (a date/hour that the family charge is performed) and transmits the increase information to the mobile terminal (the child mobile phone 32) after the transmission date and hour.

The above-explained example is effective when there is a time difference until the parent performs the family settlement after the child has applied for the family charge.

For example, assuming that the child asks for the value required on the way home from a cramming school at night after the parent goes to work, the child can carry out the family charge before going home from the cramming school if the parent makes the value settlement at lunch break.

Although the above has explained the various conformations of the family charge, a typical user interface that is used when providing the family charge service will now be explained.

FIG. 16(*a*) is a top screen that is displayed in a display of the parent mobile phone 31 when the parent mobile phone 31 accesses the service site of the electronic money server 2.

In the top screen, various items are displayed so as to be selectable.

"1. BALANCE INQUIRY" is an item that is used to display the value currently stored in the parent mobile phone 31.

"2. TRANSACTION HISTORY" is an item that is used to display a history of transactions carried out by using the value in the parent mobile phone 31.

"3. VALUE CHARGE" is an item that is used to charge the parent mobile phone 31 on credit or set a family charge scheme for the child mobile phone 32.

"4. VALUE RECEPTION" is an item that is used to charge the parent mobile phone 31 with the value issued to a user of the parent mobile phone 31 through, e.g., a point service or gift.

"5. VALUE TRANSFER" is an item that is used to transfer the value stored in the parent mobile phone 31 to the arbitrary mobile phone 7.

It is to be noted that the value can be transmitted to the child mobile phone 32 by using this value transfer, but this transmission is a complicated time-consuming operation as compared with the family charge.

That is, since "5. VALUE TRANSFER" does not have a registration relationship between a transfer source and a transfer destination, an electronic mail for requesting transfer must be first transmitted from the child mobile phone 32 to the parent mobile phone 31, and then electronic mails for confirmation must be transmitted to each other or these mobile phones must individually access the service site of the electronic money server 2.

"6. SERVICE MENU" is an item that is used to select any other service, and registration of the family charge service is performed by using this item.

When "6. SERVICE MENU" is selected, a service menu screen depicted in FIG. 16(*b*) is displayed.

In the service menu screen, "(1) SERVICE REGISTRATION", "(2) FAMILY REGISTRATION", and "(3) OTHERS" are displayed. Additionally, when "(2) FAMILY REGISTRATION" is selected, such a family registration screen as depicted in FIG. 17 is displayed, and a representative performs registration for the family charge service.

The family registration screen will now be explained hereinafter.

"YOUR ELECTRONIC MONEY FUNCTION UNIT ID" is a section where an electronic money function unit ID set to the IC chip 12 in the parent mobile phone 31 is input. It is to be noted that this item can be automatically read from the IC chip 12 and input by the electronic money application unit 15 (FIG. 3). Further, when the electronic money server 2 can recognize the electronic money function unit ID, input of this item can be omitted.

"FAMILY'S ELECTRONIC MONEY FUNCTION UNIT ID" is a section where an electronic money function unit ID set to the IC chip 12 of the child mobile phone 32 subjected to the family registration is input. In this section, a plurality of electronic money function unit IDs can be input.

The electronic money function unit IDs input in these sections are stored in the "electronic money function unit ID" of the family database 59 (FIG. 6).

"CREDIT CARD NUMBER" is a section where a credit number of a representative's credit card is input.

"CREDIT CARD SECURITY CODE" is a section where a security code of a representative's credit card is input.

Information input to these sections are stored in the "credit information" of the family database 59.

An upper limit amount per single operation and an upper limit amount per month can be input to "FAMILY'S CHARGE UPPER LIMIT", and information input to this section is stored in the "family charge restriction information" of the family database 59.

"AMOUNT REQUIRING NO PRIOR PERMISSION" is a section where a money amount that can be used for charge without permission from the parent when the child requests for the family charge is input.

"TIME REQUIRED FOR PERMISSION" is a section that a time limit until the parent grants permission after the child requests for the family charge is input. This time corresponding to N minutes at the step 260 in FIG. 13.

Information input in these sections is stored in an "amount requiring no prior permission" and a "time required for permission" (which is not shown in FIG. 6) of the family database 59.

"FAMILY PASSWORD" is a section where a family password is set, and the family password input in this section is stored in a "family password" of the family database 59.

It is to be noted that the family password can be changed from the user interface of the parent mobile phone 31 as required.

Moreover, in regard to the "family relationship" of the family database 59, a user who has set the family registration screen is determined as a representative, and a user of the mobile phone 7 set in the "FAMILY'S ELECTRONIC MONEY FUNCTION UNIT ID" is determined as a regular person.

After inputting these items, when a transmission button is clicked, the items input by a user are transmitted to the electronic money server 2 to be stored in the family database 59.

In this manner, a family group is formed in the family database 59.

It is to be noted that an electronic mail address previously registered by each user in the user database 58 is used as the "electronic mail address" in the family database 59, and hence the electronic mail address does not necessarily have to be input from the family registration screen.

Further, when "3. VALUE CHARGE" is selected from the top screen depicted in FIG. 18(*a*), a value charge screen shown in FIG. 18(*b*) is displayed.

The value charge screen has items "(1) CREDIT CHARGE" AND "(2) FAMILY CHARGE", and selecting "(1) CREDIT CHARGE" enables charging the IC chip 12 of the parent mobile phone 31 with the value based on credit. On the other hand, in "(2) FAMILY CHARGE", "REGULAR CHARGE" and "DISTRIBUTION CHARGE" can be selected.

The electronic money server 2 performs the family charge based on the regular charge when a representative selects "REGULAR CHARGE", and the electronic money server 2 performs the family charge based on the distribution when the "DISTRIBUTION CHARGE" is selected. It is to be noted that the distribution charge means the family charge based on the distribution explained in conjunction with FIG. 14.

FIG. 19 shows a distribution setting screen displayed when "DISTRIBUTION CHARGE" depicted in FIG. 18(*b*) is selected.

In the distribution setting screen, "CHARGE AMOUNT" is a section where a total amount of money distributed to children is input.

"CREDIT SECURITY CODE" is a section where a security code of a credit card is input. The security code has been already input in "CREDIT SECURITY CODE" in FIG. 17, and hence it is input for confirmation.

"DISTRIBUTION DESTINATION" is a section where the child mobile phone 32 as a distribution destination to which the value is distributed based on the family charge is set. When a pull-down button provided at an end of the section is selected, a list of the child mobile phones 32 belonging to the family group is displayed, and the plurality of child mobile phones can be selected.

"DISTRIBUTION AMOUNT" is a section where a money amount distributed to each child mobile phone 32 is set. A money amount that differs depending on each child mobile phone 32 can be set.

"DISTRIBUTION TIME" is a section where a date and hour that the value generated by the electronic money server 2 on credit is distributed to each child mobile phone 32 is set.

"MESSAGE" is a section where a message that is transmitted to the child mobile phone 32 at the time of the family charge, e.g., "it is this month's spending money. Do not waste your money." is set.

When the above-explained items are set and a transmission button is clicked, distribution information is transmitted from the parent mobile phone 31 to the electronic money server 2 to be registered.

Then, such registered contents as shown in FIG. 19(*b*) are displayed in the parent mobile phone 31.

FIG. 20(*a*) is a top screen that is displayed in the display of the child mobile phone 32 when the child mobile phone 32 accesses the service site of the electronic money server 2.

The top screen for the child mobile phone 32 is the same as the top screen for the parent mobile phone 31.

When the child utilizes the family charge service, "3. VALUE CHARGE" is selected.

Then, a charge screen shown in FIG. 20(*b*) is displayed, and "IMMEDIATE CHARGE" and "CHARGE RESERVATION" can be selected in an item "(2) FAMILY CHARGE".

It is to be noted that the child mobile phone 32 cannot be charge on credit of the child, and hence the item "(1) CREDIT CHARGE" cannot be selected.

"IMMEDIATE CHARGE" is a service that is rapidly executed when the child requests for the family charge as explained in conjunction with FIGS. 8 to 12, for example and the business entity of the electronic money system 1 determines which service is to be adopted on a stage of system design.

Figure 15:
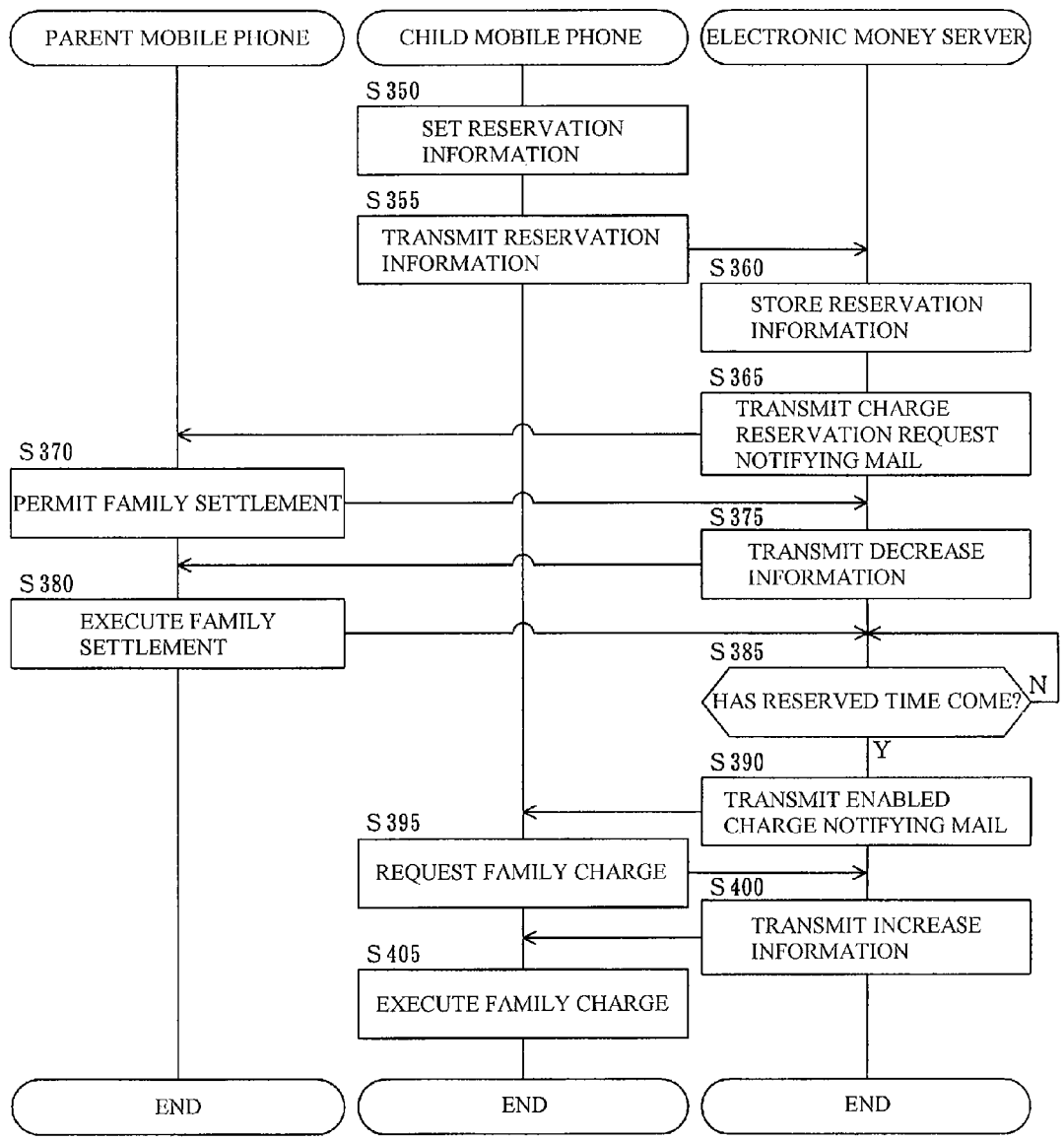
FIG. 15 is a flowchart for explaining a procedure of making a reservation for the family charge.

Furthermore, in "CHARGE RESERVATION", the child specifies a date and hour of the family charge as explained in FIG. 15, for example.

When "IMMEDIATE CHARGE" is selected in FIG. 20(*b*), such a family charge application screen as shown in FIG. 20(*c*) is displayed.

"YOUR ELECTRONIC MONEY FUNCTION UNIT ID" is a section where an electronic money function unit ID set to the IC chip 12 in the child mobile phone 32 is input. The electronic money function unit ID may be automatically read from the IC chip 12 and input by the electronic money application unit 15.

"FAMILY'S ELECTRONIC MONEY FUNCTION UNIT ID" is a section where an electronic money function unit ID of the parent mobile phone 31 of a representative who defrays the family charge is input.

In regard to this section, when a plurality of representatives are present, a pull-down menu can be used to see and select them.

"CHARGE AMOUNT" is a money amount required for the family charge.

Furthermore, although omitted in FIG. 20(*c*), there is also a section where a family password is input, and the child inputs the family password from this section.

When a transmission button is clicked, the child mobile phone 32 transmits a family charge request including the above-explained information to the electronic money server 2.

Figure 21:
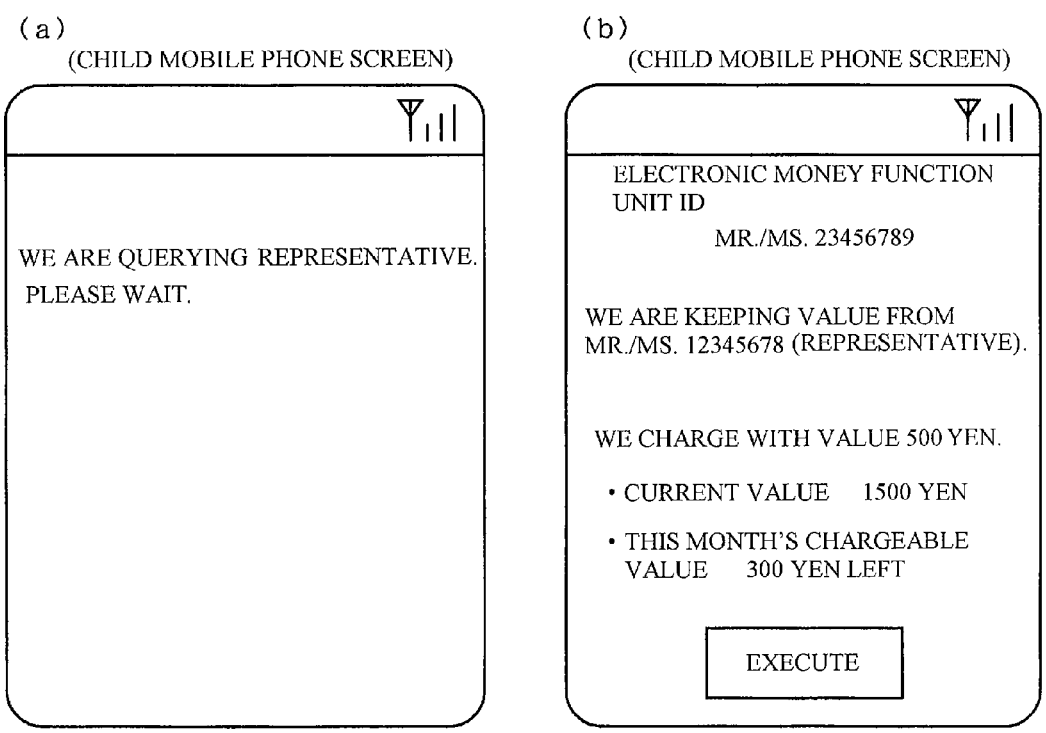
FIG. 21 shows an example of screens displayed in the display of the child mobile phone.

When the electronic money server 2 receives the family charge request information from the child mobile phone 32, it obtains permission for the family settlement from the parent mobile phone 31, and the electronic money server 2 displays such a standby screen as shown in FIG. 21(*a*) in the display of the child mobile phone 32 in the meantime.

Moreover, when the parent mobile phone 31 grants permission for the family settlement, the electronic money server 2 displays such a family charge execution screen as shown in FIG. 21(*b*) in the display of the child mobile phone 32. Additionally, when an execution button is clicked in the family charge execution screen, the family charge is executed.

On the other hand, when "CHARGE RESERVATION" is selected in the charge screen as shown in FIG. 22(*a*), such a family charge reservation screen as depicted in FIG. 22(*b*) is displayed.

Input contents in the reservation screens "YOUR ELECTRONIC MONEY FUNCTION UNIT ID", "FAMILY'S ELECTRONIC MONEY FUNCTION UNIT ID", and "CHARGE AMOUNT" are the same as those in the family charge application screen in FIG. 20(*c*).

"PASSWORD" is a section where a family password is input, and CHARGE TIME is a section where a date and hour for which the family charge is reserved is input.

When a transmission button is clicked, the family charge request information including the above-explained information is transmitted to the electronic money server 2.

Although the above explanation presupposes the family charge request from the child mobile phone 32, an electronic money function unit ID of the IC card 6 owned by the child may be registered when registering the family information.

In this case, the parent mobile phone 31 may be requested for the family charge through the user terminal 9 or a non-illustrated online in-store terminal (e.g., the electronic money terminal 8).

That is, combining a communicating function of the user terminal 9 or the in-store terminal with a value processing function of the IC card 6 enables realizing a function equivalent to that of the child mobile phone 32 (i.e., a function of accessing the electronic money server 2 to request the family charge or perform the value charge and others).

Additionally, when permission for the family charge is obtained, the electronic money server 2 can be connected with the IC chip (connecting means) through the IC card 6 or the in-store terminal (a communication terminal) to transmit increase information.

Therefore, the child can set the IC card 6 to the user terminal 9 at home or the in-store terminal and access the service site of the electronic money server 2 to effect the family charge.

Further, the parent mobile phone 31 owned by the parent may be substituted by the IC card 6. In this case, the parent can set the IC card 6 to the user terminal 9 at home or the in-store terminal and decrease the value from the IC card 6 to make the family settlement.

The following effects can be obtained from the above-explained embodiment.

(1) For example, when a representative and a regular person, e.g., a parent and a child are grouped as a family group, the regular person can perform the family charge based on defrayment on the representative. Therefore, even a person who cannot utilize credit of a credit card, e.g., a person under age can rapidly carry out the charge online.

(2) Since the representative and the regular person are registered as a family in advance, it is possible to rapidly ask the representative for the family settlement permission when the regular person requests the family charge.

(3) Registering credit information of the representative enables the regular person to carry out the family charge on credit of the representative.

(4) Depositing the value in the family account enables the regular person to carry out the family charge any time.

(5) It is possible to realize various operations, e.g., distributing the value to the regular person by the representative or making reservation for the family charge by the regular person.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing system, comprising:
   a first mobile device and a second mobile device, wherein the first and second mobile devices each include an IC chip, and wherein the IC chip includes an antenna configured to perform near field communication;
   an electronic money terminal configured to communicate with at least one of the first mobile device and the second mobile device by near field communication via the antenna; and
   a server including a processor, a storage device and a communication control device;
   wherein the first mobile device stores a first monetary value and the second mobile device stores a second monetary value, and wherein the second mobile device is configured to send a charge request to the server to change the second monetary value in the second mobile device;
   wherein the storage device is configured to store a family information for a family group including a first person and a second person, wherein the first person is associated with the first mobile device and the second person is associated with the second mobile device;
   wherein the communication control device is configured to perform wireless communication with at least one of the first mobile device and the second mobile device via a base station,
   wherein the communication control device transmits a charge request notification to the first mobile device when the server receives the charge request from the second mobile device, and the charge request notification is based on a confirmation of the family information,
   wherein the processor is configured to obtain a balance of the first monetary value stored in the first mobile device, and
   wherein the communication control device is configured to:
   (a) when a response that grants permission for the charge request is received from the first mobile device within a predetermined time, transmit decrease information to the first mobile device, wherein based on the decrease information, the first mobile device executes a family settlement by decreasing the balance of the first monetary value in the first mobile device by a money amount corresponding to the charge request; and transmit increase information to the second mobile device through the electronic money terminal, wherein based on the increase information the second mobile device executes a family charge by increasing a balance of the second monetary value in the second mobile device by the money amount corresponding to the charge request; and (b) when the response that grants permission for the charge request is not received from the first mobile device within the predetermined time, transmit a request to a credit server to issue credit corresponding to the money amount of the charge request, generate monetary value based on the credit and transmit increase information to the second mobile device through the electronic money terminal, wherein based on the increase information the second mobile device executes the family charge by increasing a balance of the second monetary value in the second mobile device by the money amount corresponding to the charge request.

2. The information processing system according to claim 1, wherein the family information includes at least one of a family ID, a family password, a family account number, or an electronic mail address.

3. The information processing system according to claim 1, wherein the second person does not have credit information registered in the family information.

4. The information processing system according to claim 1, wherein the first and second mobile devices each include a phone function unit, and wherein the phone function unit and the IC chip are connected through an interface unit.

5. The information processing system according to claim 4, wherein the IC chip includes a value processing unit, and the value processing unit is configured to change the first and second monetary value stored in the first mobile device or the second mobile device.

6. The information processing system according to claim 4, wherein the IC chip includes a high-frequency circuit configured to communicate with the electronic money terminal.

7. The information processing system according to claim 1, wherein the family information includes credit information.

* * * * *